(12) United States Patent
Moriau et al.

(10) Patent No.: US 7,650,728 B2
(45) Date of Patent: *Jan. 26, 2010

(54) FLOOR PANELS WITH EDGE CONNECTORS

(75) Inventors: Stefan Simon Gustaaf Moriau, Sint-Denijs Westrem (BE); Mark Gaston Maurits Cappelle, Staden (BE); Bernard Paul Joseph Thiers, Oostrozebeke (BE)

(73) Assignee: UNILIN BEHEER BV besloten vennootschap, Ijssel (NL)

( * ) Notice: Subject to any disclaimer, the term of this patent is extended or adjusted under 35 U.S.C. 154(b) by 0 days.

This patent is subject to a terminal disclaimer.

(21) Appl. No.: 11/453,815

(22) Filed: Jun. 16, 2006

(65) Prior Publication Data

US 2006/0254183 A1 Nov. 16, 2006

Related U.S. Application Data

(63) Continuation of application No. 11/417,189, filed on May 4, 2006, which is a continuation of application No. 10/256,183, filed on Sep. 27, 2002, now Pat. No. 7,040,068, which is a continuation of application No. 09/471,014, filed on Dec. 23, 1999, now Pat. No. 6,490,836, which is a continuation of application No. 08/872,044, filed on Jun. 10, 1997, now Pat. No. 6,006,486.

(30) Foreign Application Priority Data

| Jun. 11, 1996 | (BE) | ................................. 9600527 |
| Apr. 15, 1997 | (BE) | ................................. 9700344 |

(51) Int. Cl.
   *E04B 2/00* (2006.01)

(52) U.S. Cl. .................. 52/588.1; 52/390; 52/539; 52/592.2

(58) Field of Classification Search ............ 52/578, 52/588.1, 592.2, 390, 392, 533, 534, 539, 52/553, 582.1, 586.1, 586.2, 589.1, 590.2, 52/590.3, 591.1, 591.2, 591.3, 591.4, 591.5, 52/592.1, 582.2, 582.4, 745.08, 745.19, 747.1, 52/747.11, 748.1, 748.11; 403/334, 345, 403/364–368, 372, 375, 376, 381; 404/34, 404/35, 40, 41, 47, 49–58, 68, 70; 428/44, 428/47–50, 57, 58, 60, 61, 106, 192–194
See application file for complete search history.

(56) References Cited

U.S. PATENT DOCUMENTS 208,036 A  9/1878  Robley (Continued)

FOREIGN PATENT DOCUMENTS

AT   000 112 U2   2/1995

(Continued)

OTHER PUBLICATIONS

Träindustrins Handbook "Snickeriarbete", 2$^{nd}$ Ed., Malmö 1952. p. 827, Fig. 614 and p. 855, 2$^{nd}$ Para.

(Continued)

*Primary Examiner*—Richard E Chilcot, Jr.
*Assistant Examiner*—William V Gilbert
(74) *Attorney, Agent, or Firm*—Bacon & Thomas, PLLC.

(57) ABSTRACT

Floor covering, including hard floor panels which, at least at the edges of two opposite sides, are provided with coupling parts, cooperating which each other, substantially in the form of a tongue and a groove, wherein the coupling parts are provided with integrated mechanical locking elements which prevent the drifting apart of two coupled floor panels in a direction (R) perpendicular to the related edges and parallel to the underside of the coupled floor panels, and provide a snap-action coupling.

9 Claims, 10 Drawing Sheets

U.S. PATENT DOCUMENTS

| | | | |
|---|---|---|---|
| 213,740 A | 4/1879 | Conner | |
| 308,313 A | 11/1884 | Gerike | |
| 662,458 A | 11/1900 | Nagel | |
| 713,577 A | 11/1902 | Wickham | |
| 714,987 A | 12/1902 | Wolfe | |
| 753,791 A | 3/1904 | Fulghum | |
| 769,355 A | 9/1904 | Platow | |
| 823,003 A | 9/1906 | Torrenoe | |
| 832,003 A | 9/1906 | Torrence | |
| 877,639 A | 1/1908 | Galbraith | |
| 890,436 A | 6/1908 | Momberg | |
| 898,381 A | 9/1908 | Mattison | |
| 956,046 A | 4/1910 | Davis | |
| 1,078,776 A | 11/1913 | Dunton | |
| 1,097,986 A | 5/1914 | Moritz | |
| 1,124,228 A | 1/1915 | Houston | |
| 1,137,197 A | 4/1915 | Ellis | |
| 1,140,958 A | 5/1915 | Cowan | |
| 1,201,285 A | 10/1916 | Gray | |
| 1,319,286 A | 10/1919 | Johnson et al. | |
| 1,371,856 A | 3/1921 | Cade | |
| 1,407,679 A | 2/1922 | Ruthrauff | |
| 1,411,415 A | 4/1922 | Cooley | |
| 1,454,250 A | 5/1923 | Parsons | |
| 1,468,288 A | 9/1923 | Een | |
| 1,477,813 A | 12/1923 | Daniels et al. | |
| 1,510,924 A | 10/1924 | Daniels et al. | |
| 1,540,128 A | 6/1925 | Houston | |
| 1,575,821 A | 3/1926 | Daniels | |
| 1,602,256 A | 10/1926 | Sellin | |
| 1,602,267 A | 10/1926 | Karwisch | |
| 1,615,096 A | 1/1927 | Meyers | |
| 1,622,103 A | 3/1927 | Fulton | |
| 1,622,104 A | 3/1927 | Fulton | |
| 1,637,634 A | 8/1927 | Carter | |
| 1,644,710 A | 10/1927 | Crooks | |
| 1,660,480 A | 2/1928 | Daniels | |
| 1,706,924 A | 3/1929 | Kane | |
| 1,714,738 A | 5/1929 | Smith | |
| 1,718,702 A | 6/1929 | Pfiester | |
| 1,734,826 A | 11/1929 | Pick | |
| 1,764,331 A | 6/1930 | Moratz | |
| 1,776,188 A | 9/1930 | Langbaum | |
| 1,778,069 A | 10/1930 | Fetz | |
| 1,787,027 A | 12/1930 | Wasleff | |
| 1,823,039 A | 9/1931 | Gruner | |
| 1,838,098 A | 12/1931 | Holbrook | |
| 1,854,396 A | 4/1932 | Davis | |
| 1,859,667 A | 5/1932 | Gruner | |
| 1,864,774 A | 6/1932 | Storm | |
| 1,898,364 A | 2/1933 | Gynn | |
| 1,906,411 A | 5/1933 | Potvin | |
| 1,913,342 A | 6/1933 | Schaffert | |
| 1,923,928 A | 8/1933 | Jacobs | |
| 1,929,871 A | 10/1933 | Jones | |
| 1,940,377 A | 12/1933 | Storm | |
| 1,953,306 A | 4/1934 | Moratz | |
| 1,986,739 A | 1/1935 | Mitte | |
| 1,988,201 A | 1/1935 | Hall | |
| 1,991,701 A | 2/1935 | Roman | |
| 2,004,193 A | 6/1935 | Cherry | |
| 2,027,292 A | 1/1936 | Rockwell | |
| 2,044,216 A | 6/1936 | Klages | |
| 2,045,067 A | 6/1936 | Bruce | |
| 2,049,571 A | 8/1936 | Schuck | |
| 2,141,708 A | 12/1938 | Elmendorf | |
| 2,142,305 A | 1/1939 | Davis | |
| 2,199,938 A | 5/1940 | Kloote | |
| 2,222,137 A | 11/1940 | Bruce | |
| 2,226,540 A | 12/1940 | Boettcher | |
| 2,245,497 A | 6/1941 | Potchen | |
| 2,261,897 A | 11/1941 | Adams | |
| 2,263,930 A | 11/1941 | Pasquier | |
| 2,266,464 A | 12/1941 | Kraft | |
| 2,276,071 A | 3/1942 | Scull | |
| 2,279,670 A | 4/1942 | Ford et al. | |
| 2,282,559 A | 5/1942 | Byers | |
| 2,306,328 A | 12/1942 | Biberthaler | |
| 2,317,223 A | 4/1943 | Rottman | |
| 2,324,628 A | 7/1943 | Kähr | |
| 2,398,632 A | 4/1946 | Frost et al. | |
| 2,430,200 A * | 11/1947 | Wilson | 52/588.1 |
| 2,441,364 A | 5/1948 | Maynard | |
| 2,491,498 A | 12/1949 | Kahr | |
| 2,644,552 A | 7/1953 | MacDonald | |
| 2,729,584 A | 1/1956 | Foster | |
| 2,740,167 A | 4/1956 | Rowley | |
| 2,780,253 A | 2/1957 | Joa | |
| 2,805,852 A * | 9/1957 | Malm | 266/283 |
| 2,807,401 A | 9/1957 | Smith | |
| 2,808,624 A | 10/1957 | Sullivan | |
| 2,858,969 A | 11/1958 | Williams et al. | |
| 2,875,117 A | 2/1959 | Potehen et al. | |
| 2,894,292 A | 7/1959 | Gramelspacher | |
| 2,914,815 A | 12/1959 | Alexander | |
| 2,947,040 A | 8/1960 | Schultz | |
| 2,952,341 A | 9/1960 | Weiler | |
| 2,974,692 A | 3/1961 | Bolenbach | |
| 3,045,294 A | 7/1962 | Livezey, Jr. | |
| 3,090,082 A | 5/1963 | Baumann | |
| 3,098,600 A | 7/1963 | Hagan et al. | |
| 3,100,556 A | 8/1963 | De Ridder | |
| 3,125,138 A | 3/1964 | Bolenbach | |
| 3,128,851 A | 4/1964 | Deridder et al. | |
| 3,178,093 A | 4/1965 | Wasyluka | |
| 3,182,769 A | 5/1965 | De Ridder | |
| 3,200,553 A | 8/1965 | Frashour et al. | |
| 3,203,149 A | 8/1965 | Soddy | |
| 3,204,380 A | 9/1965 | Smith et al. | |
| 3,253,377 A | 5/1966 | Schakel | |
| 3,267,630 A | 8/1966 | Omholt | |
| 3,282,010 A | 11/1966 | King, Jr. | |
| 3,301,147 A | 1/1967 | Clayton et al. | |
| 3,310,919 A | 3/1967 | Bue et al. | |
| 3,313,072 A | 4/1967 | Cue | |
| 3,347,048 A | 10/1967 | Brown et al. | |
| 3,373,071 A | 3/1968 | Fuerst | |
| 3,387,422 A | 6/1968 | Wanzer | |
| 3,425,543 A | 2/1969 | Harvey et al. | |
| 3,460,304 A | 8/1969 | Braeuninger et al. | |
| 3,469,762 A | 9/1969 | Torre | |
| 3,481,810 A | 12/1969 | Waite | |
| 3,526,420 A | 9/1970 | Brancaleone | |
| 3,535,844 A | 10/1970 | Glaros | |
| 3,538,665 A | 11/1970 | Gall | |
| 3,538,819 A | 11/1970 | Bould, Jr. et al. | |
| 3,548,559 A | 12/1970 | Levine | |
| 3,553,919 A | 1/1971 | Omholt | |
| 3,555,762 A | 1/1971 | Costanzo, Jr. | |
| 3,559,876 A | 2/1971 | Conescu | |
| 3,579,941 A | 5/1971 | Tibbals | |
| 3,619,964 A | 11/1971 | Passaro et al. | |
| 3,640,191 A | 2/1972 | Hendrich | |
| 3,657,852 A | 4/1972 | Worthington et al. | |
| 3,667,153 A | 6/1972 | Christiansen | |
| 3,694,983 A | 10/1972 | Couquet | |
| 3,698,548 A | 10/1972 | Stenzel et al. | |
| 3,714,747 A | 2/1973 | Curran | |
| 3,731,445 A | 5/1973 | Hoffmann et al. | |
| 3,740,914 A | 6/1973 | Diez | |
| 3,742,672 A | 7/1973 | Schaeufele | |
| 3,759,007 A | 9/1973 | Thiele | |
| 3,760,548 A | 9/1973 | Sauer et al. | |
| 3,761,338 A | 9/1973 | Ungar et al. | |

| | | | | | | |
|---|---|---|---|---|---|---|
| 3,768,846 | A | 10/1973 | Hensley et al. | 5,247,773 | A | 9/1993 | Weir |
| 3,780,469 | A | 12/1973 | Hancovsky | 5,253,464 | A | 10/1993 | Nilsen |
| 3,786,608 | A | 1/1974 | Boettcher | 5,266,384 | A | 11/1993 | O'Dell et al. |
| 3,798,111 | A | 3/1974 | Lane et al. | 5,274,979 | A * | 1/1994 | Tsai ................ 52/588.1 |
| 3,807,113 | A | 4/1974 | Turner | 5,283,102 | A | 2/1994 | Sweet et al. |
| 3,859,000 | A | 1/1975 | Webster | 5,295,341 | A | 3/1994 | Kajiwara |
| 3,884,328 | A | 5/1975 | Williams | 5,348,778 | A | 9/1994 | Knipp et al. |
| 3,902,293 | A | 9/1975 | Witt et al. | 5,349,796 | A | 9/1994 | Meyerson |
| 3,908,053 | A | 9/1975 | Hettich | 5,390,457 | A | 2/1995 | Sjölander |
| 3,936,551 | A | 2/1976 | Elmendorf et al. | 5,413,840 | A | 5/1995 | Mizuno |
| 3,964,607 | A | 6/1976 | Wagner | 5,433,806 | A | 7/1995 | Pasquali et al. |
| 3,987,599 | A | 10/1976 | Hines | 5,474,831 | A | 12/1995 | Nystrom |
| 3,988,187 | A | 10/1976 | Witt et al. | 5,475,960 | A | 12/1995 | Lindal |
| 4,021,087 | A | 5/1977 | Ferguson | 5,495,727 | A | 3/1996 | Strong et al. |
| 4,037,377 | A | 7/1977 | Howell et al. | 5,497,589 | A | 3/1996 | Porter |
| 4,074,496 | A | 2/1978 | Fischer | 5,502,939 | A | 4/1996 | Zadok et al. |
| 4,090,338 | A | 5/1978 | Bourgade | 5,526,857 | A | 6/1996 | Forman |
| 4,095,913 | A | 6/1978 | Pettersson et al. | 5,540,025 | A | 7/1996 | Takehara et al. |
| 4,099,358 | A | 7/1978 | Compaan | 5,545,501 | A | 8/1996 | Tavernier et al. |
| 4,100,710 | A | 7/1978 | Kowallik | 5,566,519 | A | 10/1996 | Almaraz-Miera |
| 4,156,048 | A | 5/1979 | Davis | 5,570,554 | A | 11/1996 | Searer |
| 4,164,832 | A | 8/1979 | Van Zandt | 5,618,602 | A | 4/1997 | Nelson |
| 4,165,305 | A | 8/1979 | Sundie et al. | 5,630,304 | A | 5/1997 | Austin |
| 4,169,688 | A | 10/1979 | Toshio | 5,647,181 | A | 7/1997 | Hunts |
| 4,182,072 | A | 1/1980 | Much | 5,706,621 | A | 1/1998 | Pervan |
| 4,186,539 | A | 2/1980 | Harmon et al. | 5,736,227 | A | 4/1998 | Sweet et al. |
| 4,242,390 | A | 12/1980 | Nemeth | 5,755,068 | A | 5/1998 | Ormiston |
| 4,260,442 | A | 4/1981 | Ford et al. | 5,768,850 | A | 6/1998 | Chen |
| 4,299,070 | A | 11/1981 | Oltmanns et al. | 5,797,237 | A | 8/1998 | Finhell, Jr. |
| 4,316,351 | A | 2/1982 | Ting | 5,860,267 | A | 1/1999 | Pervan |
| 4,372,899 | A | 2/1983 | Wiemann et al. | D406,360 | S | 3/1999 | Finkell, Jr. |
| 4,390,580 | A | 6/1983 | Donovan et al. | 5,937,612 | A | 8/1999 | Winer et al. |
| 4,426,820 | A | 1/1984 | Terbrack et al. | 6,006,486 | A | 12/1999 | Moriau et al. |
| 4,449,346 | A | 5/1984 | Tremblay | 6,023,907 | A | 2/2000 | Pervan |
| 4,471,012 | A | 9/1984 | Maxwell | 6,029,416 | A | 2/2000 | Andersson |
| 4,489,115 | A | 12/1984 | Layman et al. | 6,182,410 | B1 | 2/2001 | Pervan |
| 4,501,102 | A | 2/1985 | Knowles | 6,271,156 | B1 | 8/2001 | Gleason et al. |
| 4,503,115 | A | 3/1985 | Hemels et al. | 6,490,836 | B1 | 12/2002 | Moriau et al. |
| 4,517,147 | A | 5/1985 | Taylor et al. | 6,588,166 | B2 | 7/2003 | Martensson et al. |
| 4,538,392 | A | 9/1985 | Hamar et al. | 6,606,834 | B2 * | 8/2003 | Martensson et al. ........ 52/578 |
| 4,561,233 | A | 12/1985 | Harter et al. | 6,874,292 | B2 | 4/2005 | Moriau et al. |
| 4,599,124 | A | 7/1986 | Kelly et al. | 6,928,779 | B2 | 8/2005 | Moriau et al. |
| 4,599,841 | A | 7/1986 | Haid | 6,955,020 | B2 | 10/2005 | Moriau et al. |
| 4,612,745 | A | 9/1986 | Hovde | 6,993,877 | B2 | 2/2006 | Moriau et al. |
| 4,635,815 | A | 1/1987 | Grigsby | 7,040,068 | B2 | 5/2006 | Moriau et al. |
| 4,640,437 | A | 2/1987 | Weingartner | | | | |
| 4,641,469 | A | 2/1987 | Wood | | | | |
| 4,643,237 | A | 2/1987 | Rosa | | FOREIGN PATENT DOCUMENTS | | |
| 4,646,494 | A | 3/1987 | Saarinen et al. | AU | 13098/83 | | 10/1983 |
| 4,653,242 | A | 3/1987 | Ezard | BE | 417526 | | 9/1936 |
| 4,703,597 | A | 11/1987 | Eggemar | BE | 556860 | A | 5/1957 |
| 4,715,162 | A | 12/1987 | Brightwell | BE | 557844 | | 5/1957 |
| 4,724,187 | A | 2/1988 | Ungar et al. | BE | 765.817 | | 9/1971 |
| 4,738,071 | A | 4/1988 | Ezard | CA | 991373 | | 6/1976 |
| 4,757,658 | A | 7/1988 | Kaempen | CA | 1049736 | A1 | 3/1979 |
| 4,769,963 | A | 9/1988 | Meyerson | CA | 2162836 | | 5/1997 |
| 4,804,138 | A | 2/1989 | McFarland | CH | 200949 | | 11/1938 |
| 4,819,932 | A | 4/1989 | Trotter | CH | 211877 | | 10/1940 |
| 4,831,806 | A | 5/1989 | Niese et al. | CH | 562 377 | | 4/1975 |
| 4,845,907 | A | 7/1989 | Meek | CN | 2091909 | U | 1/1992 |
| 4,905,442 | A | 3/1990 | Daniels | CN | 1115351 | A | 1/1996 |
| 5,029,425 | A | 7/1991 | Bogataj | CN | 1124941 | | 6/1996 |
| 5,050,362 | A | 9/1991 | Tal et al. | CN | 2242278 | Y | 12/1996 |
| 5,086,599 | A | 2/1992 | Meyerson | DE | 417526 | C | 8/1925 |
| 5,109,898 | A | 5/1992 | Schacht | DE | 1 212 275 | | 3/1966 |
| 5,113,632 | A | 5/1992 | Hanson | DE | 1 534 802 | | 4/1970 |
| 5,117,603 | A | 6/1992 | Weintraub | DE | 7 102 476 | | 1/1971 |
| 5,148,850 | A | 9/1992 | Urbanick | DE | 1 658 875 | | 9/1971 |
| 5,157,890 | A | 10/1992 | Jines | DE | 2 007 129 | | 9/1971 |
| 5,165,816 | A | 11/1992 | Parasin | DE | 1 534 278 | | 11/1971 |
| 5,179,812 | A | 1/1993 | Hill | DE | 2 139 283 | | 2/1972 |
| 5,182,892 | A | 2/1993 | Chase | DE | 2 102 537 | | 8/1972 |
| 5,216,861 | A | 6/1993 | Meyerson | | | | |

| | | | | | | |
|---|---|---|---|---|---|---|
| DE | 2159042 | * | 6/1973 | GB | 2167465 A | 5/1986 |
| DE | 2 238 660 | | 2/1974 | GB | 2 168 732 | 6/1986 |
| DE | 2 252 643 | | 5/1974 | GB | 2 221 740 | 2/1990 |
| DE | 7 402 354 | | 5/1974 | GB | 2 228 753 | 9/1990 |
| DE | 2 502 992 | | 7/1976 | GB | 2243381 | 10/1991 |
| DE | 2 616 077 | | 10/1977 | GB | 2256023 | 11/1992 |
| DE | 7 836 825 | | 6/1980 | GB | 2256023 A | * 11/1992 |
| DE | 2 917 025 | | 11/1980 | IT | 444123 | 1/1949 |
| DE | 2 916 482 | | 12/1980 | JP | 54-65528 | 5/1979 |
| DE | 2 927 425 | | 1/1981 | JP | 57-119056 | 7/1982 |
| DE | 2 940 945 | | 4/1981 | JP | 59-41560 | 3/1984 |
| DE | 7 911 924 | | 6/1981 | JP | 62-37687 | 9/1987 |
| DE | 7 928 703 | | 7/1981 | JP | 3-169967 | 7/1991 |
| DE | 3 041 781 | | 6/1982 | JP | 4-106264 | 4/1992 |
| DE | 31 04 519 A1 | | 9/1982 | JP | 5-148984 | 6/1993 |
| DE | 3104519 A1 | | 9/1982 | JP | 6154806 A | 6/1993 |
| DE | 3 214 207 | | 11/1982 | JP | 6-146553 | 5/1994 |
| DE | 31 17 605 A1 | | 11/1982 | JP | 6-200611 | 7/1994 |
| DE | 3 246 376 | | 6/1984 | JP | 6-56310 | 8/1994 |
| DE | 3 343 601 | | 6/1985 | JP | 6-320510 | 11/1994 |
| DE | 3 412 882 | | 10/1985 | JP | 6315944 A | 11/1994 |
| DE | 8 604 004 | | 6/1986 | JP | 7-076923 | 3/1995 |
| DE | 3 512 204 | | 10/1986 | JP | 7-180333 | 7/1995 |
| DE | 3 538 538 | | 5/1987 | JP | 7189466 A | 7/1995 |
| DE | 3 544 845 | | 6/1987 | JP | 7-300979 | 11/1995 |
| DE | 3 741 041 | | 9/1988 | JP | 7-310426 | 11/1995 |
| DE | 4 002 547 | | 8/1991 | JP | 96-1207 | 2/1996 |
| DE | 3 932 980 | | 11/1991 | JP | 8-109734 | 4/1996 |
| DE | 4 130 115 | | 3/1993 | JP | 8-270193 | 11/1996 |
| DE | 4 215 273 | | 11/1993 | KR | 95-33446 | 12/1995 |
| DE | 4 242 530 | | 6/1994 | NL | 76 01773 | 8/1976 |
| DE | 4402352 A1 | | 8/1995 | NL | 7708519 | 2/1978 |
| DE | 295 20 966 | | 10/1996 | RU | 857393 | 8/1981 |
| DE | 197 09 641 | | 9/1998 | SE | 372 051 | 12/1974 |
| DK | 3726-84 | | 8/1984 | SE | 450 141 | 5/1987 |
| EP | 0 196 672 | | 10/1986 | SE | 457 737 | 1/1989 |
| EP | 0 220 389 A2 | | 5/1987 | SE | 501 014 | 10/1994 |
| EP | 0248127 | | 12/1987 | SE | 502 994 | 3/1996 |
| EP | 0 279 278 | | 8/1988 | SE | 9500809-0 | 3/1996 |
| EP | 0 562 402 | | 9/1993 | WO | WO 84/02155 | 6/1984 |
| EP | 0 623 724 | | 11/1994 | WO | WO 87/03839 | 7/1987 |
| EP | 0 652 340 | | 5/1995 | WO | WO 92/17657 | 10/1992 |
| EP | 0652332 A1 | | 5/1995 | WO | WO 93/13280 | 7/1993 |
| EP | 0 690 185 | | 1/1996 | WO | WO 93/19910 | 10/1993 |
| EP | 0 715 037 A1 | | 6/1996 | WO | WO 94/01628 | 1/1994 |
| FR | 1215852 A | | 4/1960 | WO | WO 94/04773 | 3/1994 |
| FR | 1293043 | | 4/1962 | WO | WO 94/22678 | 10/1994 |
| FR | 2 209 024 | | 6/1974 | WO | WO 94/26999 | 11/1994 |
| FR | 2 278 876 | | 2/1976 | WO | WO 95/05274 | 2/1995 |
| FR | 2 445 874 | | 8/1980 | WO | WO 95/06176 | 3/1995 |
| FR | 2568295 | | 1/1986 | WO | WO 96/23942 | 8/1996 |
| FR | 2630149 | | 10/1989 | WO | WO 96/27719 | 9/1996 |
| FR | 2 637 932 | | 4/1990 | WO | WO 96/27721 | 9/1996 |
| FR | 2675174 | | 10/1992 | WO | WO 96/30177 | 10/1996 |
| FR | 2691491 | | 11/1993 | | | |
| FR | 2697275 | | 4/1994 | | | |
| FR | 2 712 329 | | 5/1995 | | | |
| GB | 356270 | | 9/1931 | | | |
| GB | 424057 | | 2/1935 | | | |
| GB | 448329 | | 6/1936 | | | |
| GB | 589635 | | 6/1947 | | | |
| GB | 599793 | | 3/1948 | | | |
| GB | 647812 | | 12/1950 | | | |
| GB | 1027709 | | 4/1966 | | | |
| GB | 1039949 | | 8/1966 | | | |
| GB | 1127915 | | 9/1968 | | | |
| GB | 1237744 | | 6/1971 | | | |
| GB | 1275511 | | 5/1972 | | | |
| GB | 1308011 | | 2/1973 | | | |
| GB | 1430423 | | 3/1976 | | | |
| GB | 2117813 | | 10/1983 | | | |
| GB | 2 126 106 | | 3/1984 | | | |
| GB | 2142670 A | | 1/1985 | | | |

OTHER PUBLICATIONS

Alu-Profil-Technik—Drawing Pring 25/6107 Aluminum Profile. Jun. 12, 1985.

Rhodes and Gehts. "MDF—A New Member of the Family of Wood-Based Panels." *1995 European Plastics Laminates Forum. TAPPI Proceedings.*

Final and Recommended Determinations of U.S. International Trade Commission in the Matter of Certain Laminated Flooring Panels, Aug. 24, 2006.

Abgustaff Kahr Opposition Against Unilin European Patent No. EP 0 843 763 (Jun. 29, 2001).

Akzento Opposition to Unilin European Patent No. EP 0 843 763 B1 (Jul. 9, 2001).

Akzenta Brief (Arguments) in Support of Intervention in Opposition Against Unilin European Patent Application No. 00201515.4 (Including Partial Translation of Document E2 Cited Therein) (Sep. 11, 2001).

EFP Floor Products Opposition Against Unilin European Patent No. EP 0 843 763 (Oct. 27, 2000).

Hornitex-Werke Opposition to Unilin European Patent No. EP 0 843 763 (Jul. 4, 2001).

Kronospan Action to Nullify Unilin German Utility Model Patent No. 297 24 428 U1, including Cited Documents E2 (with Partial Translation); E3; E5 and E6 (with Translation) (Aug. 9, 2001).

Kronospan Opposition Against Unilin European Patent No. EP 0 843 763 (Jul. 14, 2001).

Kronotex Arguments in Appeal from Decision of Germany Patent Court Upholding Validity of Unilin German Utility Model Patent No. DE-UM 29 710 175 (Jul. 17, 2000).

Kronotex Arguments filed before Federal Patent Court in Appeal from Adverse Decision of German Patent Office Upholding Validity on Unilin German Utility Model Patent No. DE-UM 297 10 175 (Jul. 24, 2001).

Kronotex Opposition Against Unilin Australian Patent Application No. 713,628 AU-B (32569/97) (Sep. 1, 2000).

Kronotex Opposition Against Unilin European Patent No. EP 0 843 763 (Jun. 29, 2001).

Observations of M. Kandl Submitted Against European Patent Application 00 201 515.4 of Unilin Beheer, Oct. 18, 2001.

"Selbst Teppichböden, PVC und Parkett verlegen", 1985 Compact Verlag München.

Valinge Aluminum Observations Regarding Unilin European Patent No. EP 0 843 763 (Nov. 19, 1998).

Valinge Aluminum Opposition Against Unilin Australia Patent Application No. 713 628 (AU-B 325 60/97) (Jun. 6, 2000).

Valinge Aluminum Opposition Against Unilin New Zealand Patent 3,29,581 (Jun. 2001).

Valinge Aluminum Opposition Against Unilin European Patent No. EP 0 843 763 with Copies of Cited Documents (Aug. 6, 2001).

*Webster's Dictionary*, definition of "scarf", p. 862, 1992, PAMCO Publ. Comp. Inc. (N.Y.).

Judgment of British Patents County Court in Patent Infringement Action Pat Nos. 02010 and 02014 involving British Patent No. EP (UK) 1 024 034 of Unilin Beheer, Sep. 25, 2003.

Transcript of Proceedings—Day 5, County Court of Patent Infringement Action Pat Nos. 02010 and 02014 involving British Patent No. EP (UK) 1 024 034 of Unilin Beheer, Jul. 18, 2003.

Expert Report of Dr. Hugh David Mansfield—Williams in British Patents County Court cases Pat 02010 and 02014, signed Jul. 7, 2003.

Expert Report of Mark Anthony Irle, signed Jul. 7, 2003, with Bundle 8A (Exhibits to report).

Notification from German PTO regarding utility model revocation proceedings against Unilin Beheer B.V. utility model No. 297 24 428 (Apr. 7, 2003). (with translation).

"Decision of Opposition Division of European Patent Office regarding EP 1 024 234 of Unilin Beheer N.V., Aug. 5, 2004."

U.S. Appl. No. 11/976,985, filed Oct. 30, 2007.
U.S. Appl. No. 11/976,986, filed Oct. 30, 2007.
U.S. Appl. No. 11/976,987, filed Oct. 30, 2007.
U.S. Appl. No. 11/976,980, filed Oct. 30, 2007.
U.S. Appl. No. 11/979,105, filed Oct. 31, 2007.
U.S. Appl. No. 11/979,106, filed Oct. 31, 2007.
Final Opinion (Public Version) of Full Commission, *In the Matter of Certain Laminated Floor Panels*, International Trade Commission, Inv. No. 337-TA-545, Jan. 24, 2007.
U.S. Appl. No. 11/215,037, filed Aug. 31, 2005.
U.S. Appl. No. 11/215,009, filed Aug. 31, 2005.
U.S. Appl. No. 11/215,010, filed Aug. 31, 2005.
U.S. Appl. No. 11/239,085, filed Sep. 30, 2005.
U.S. Appl. No. 11/417,201, filed May 4, 2006.
U.S. Appl. No. 11/417,189, filed May 4, 2006.
U.S. Appl. No. 11/449,678, filed Jun. 9, 2006.
U.S. Appl. No. 11/449,667, filed Jun. 9, 2006.
U.S. Appl. No. 11/449,807, filed Jun. 9, 2006.
U.S. Appl. No. 11/449,806, filed Jun. 9, 2006.
U.S. Appl. No. 11/449,832, filed Jun. 9, 2006.
U.S. Appl. No. 11/449,834, filed Jun. 9, 2006.
U.S. Appl. No. 11/449,826, filed Jun. 9, 2006.
U.S. Appl. No. 11/449,676, filed Jun. 9, 2006.
U.S. Appl. No. 11/449,818, filed Jun. 9, 2006.
U.S. Appl. No. 11/449,819, filed Jun. 9, 2006.
U.S. Appl. No. 11/451,370, filed Jun. 13, 2006.
U.S. Appl. No. 11/451,358, filed Jun. 13, 2006.
U.S. Appl. No. 11/454,059, filed Jun. 16, 2006.
U.S. Appl. No. 11/473,199, filed Jun. 23, 2006.
U.S. Appl. No. 11/473,200, filed Jun. 23, 2006.
U.S. Appl. No. 11/476,877, filed Jun. 29, 2006.
U.S. Appl. No. 11/481,806, filed Jul. 7, 2006.
U.S. Appl. No. 11/481,922, filed Jul. 7, 2006.
U.S. Appl. No. 11/481,921, filed Jul. 7, 2006.
U.S. Appl. No. 11/488,674, filed Jul. 19, 2006.
U.S. Appl. No. 11/606,107, filed Jul. 7, 2006.
U.S. Appl. No. 11/642,778, filed Dec. 21, 2006.
U.S. Appl. No. 11/647,197, filed Dec. 29, 2006.
U.S. Appl. No. 11/822,580, filed Jul. 9, 2007.
U.S. Appl. No. 11/822,581, filed Jul. 9, 2007.
U.S. Appl. No. 11/822,582, filed Jul. 9, 2007.
Abstract of CN 1054215, Published Sep. 4, 1991.
English translation of DE 1 534 802 (6 pages).
English translation of DE 33 43 601, (11pages).
English translation of DE 42 42 530 (17 pages).
English Translation of DE 30 41 781 (11 pages).
English Translation of DE 35 44 845 (26 pages).

\* cited by examiner

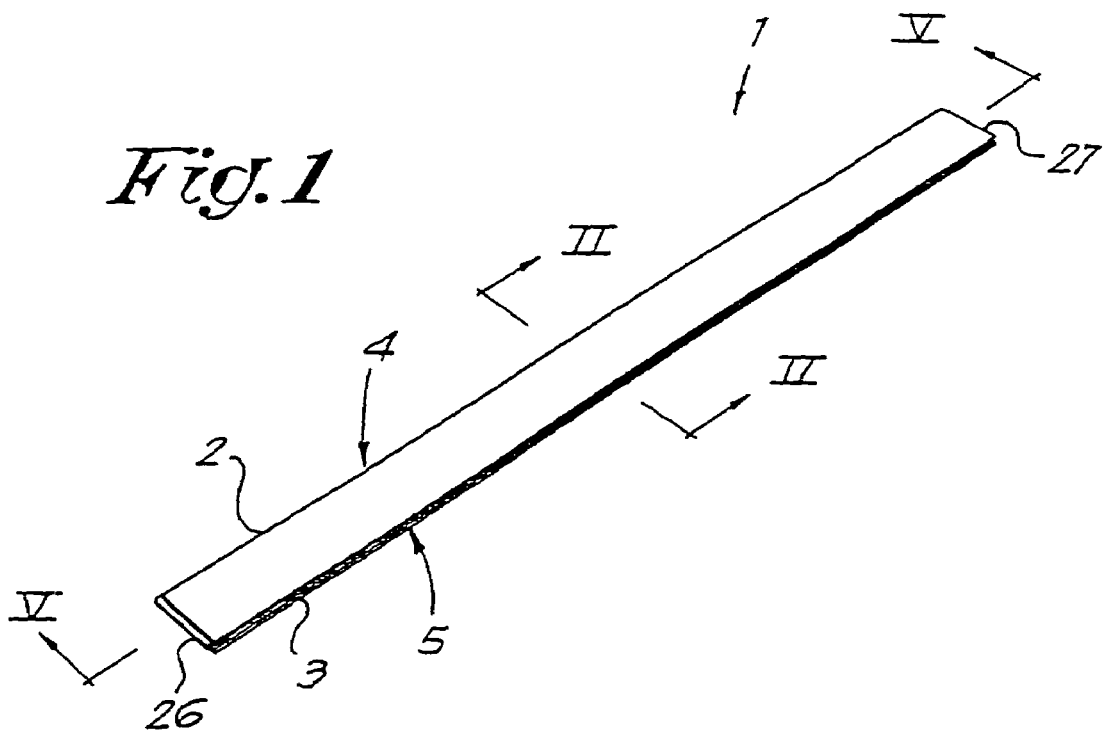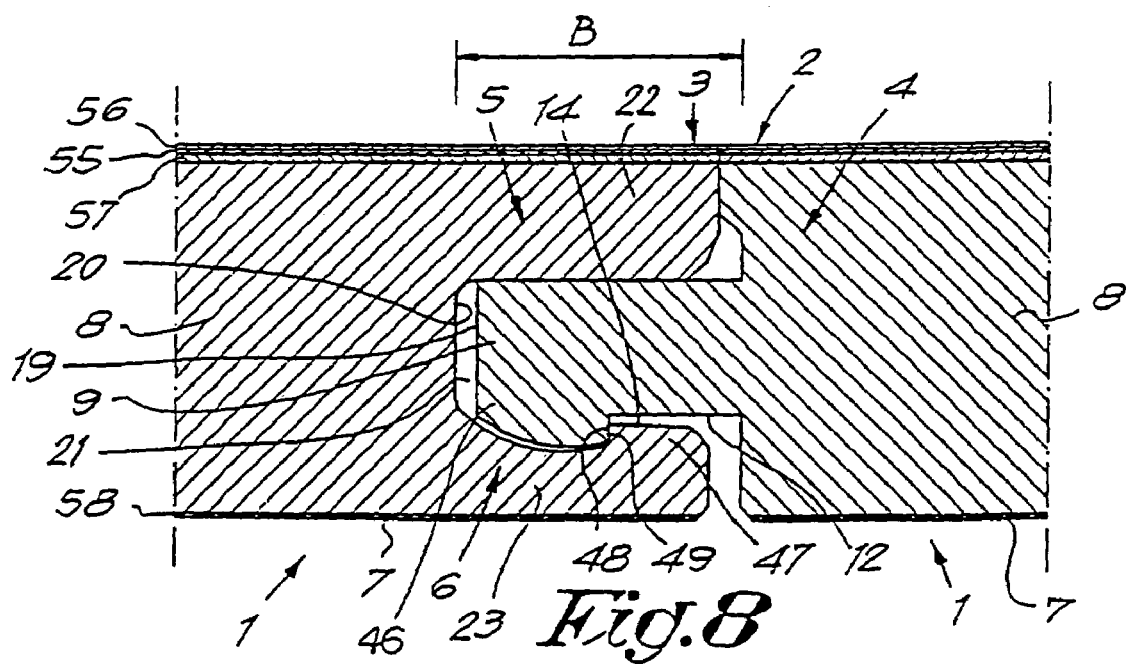

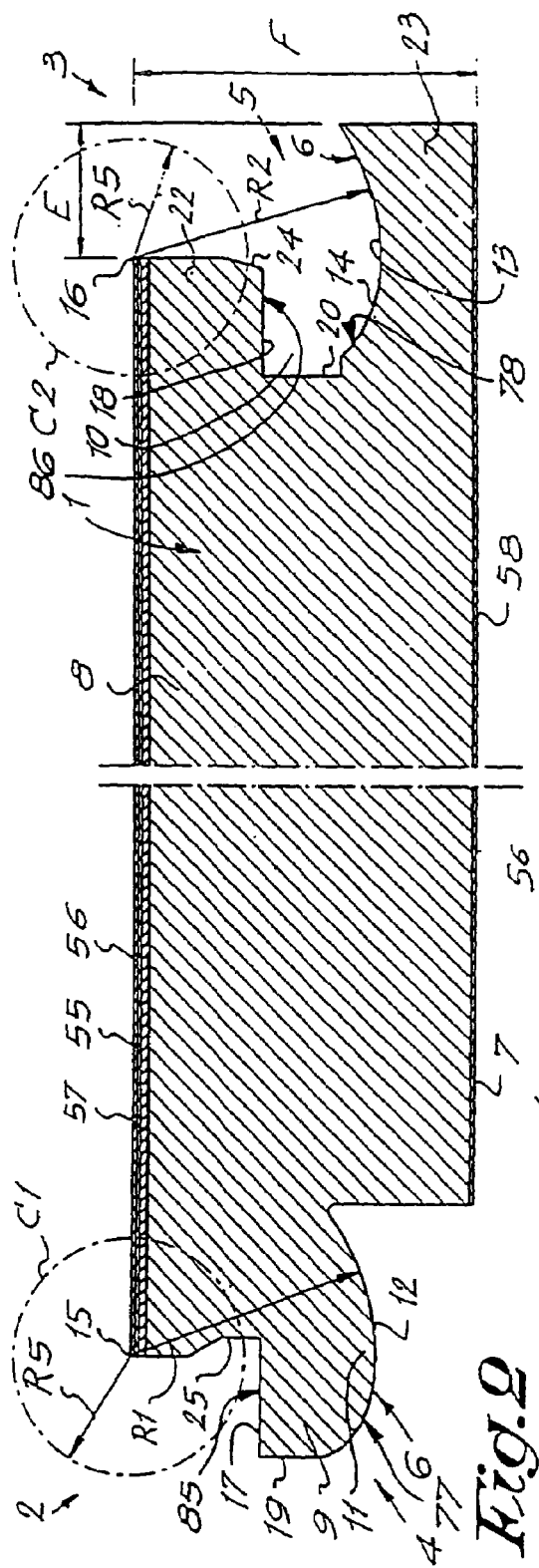
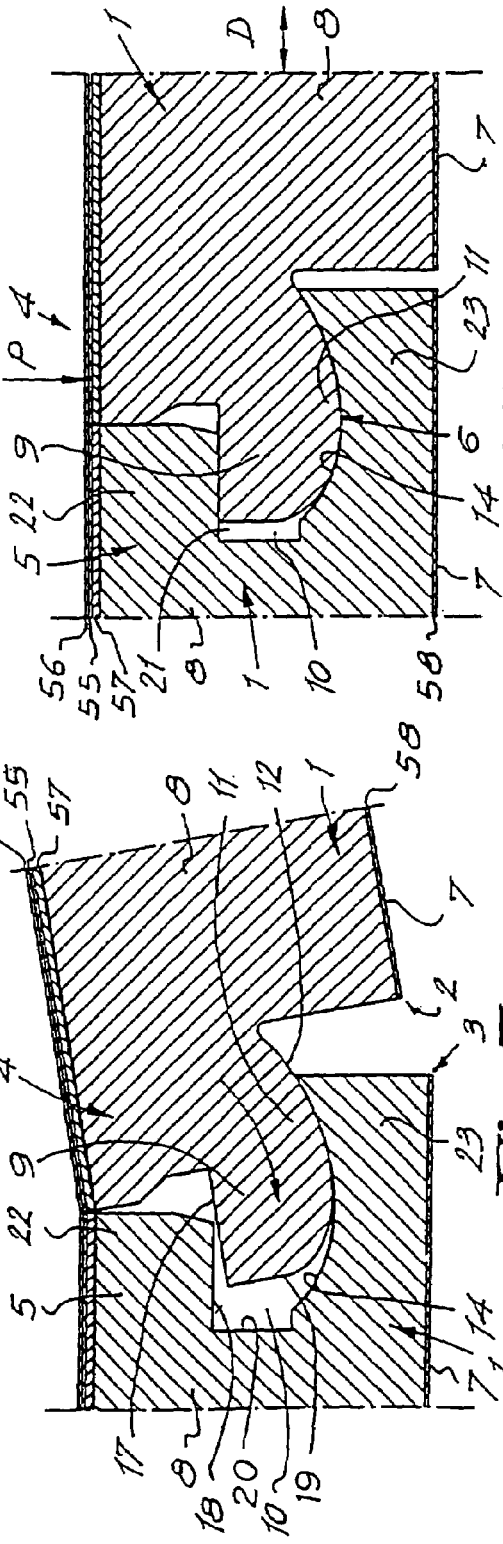

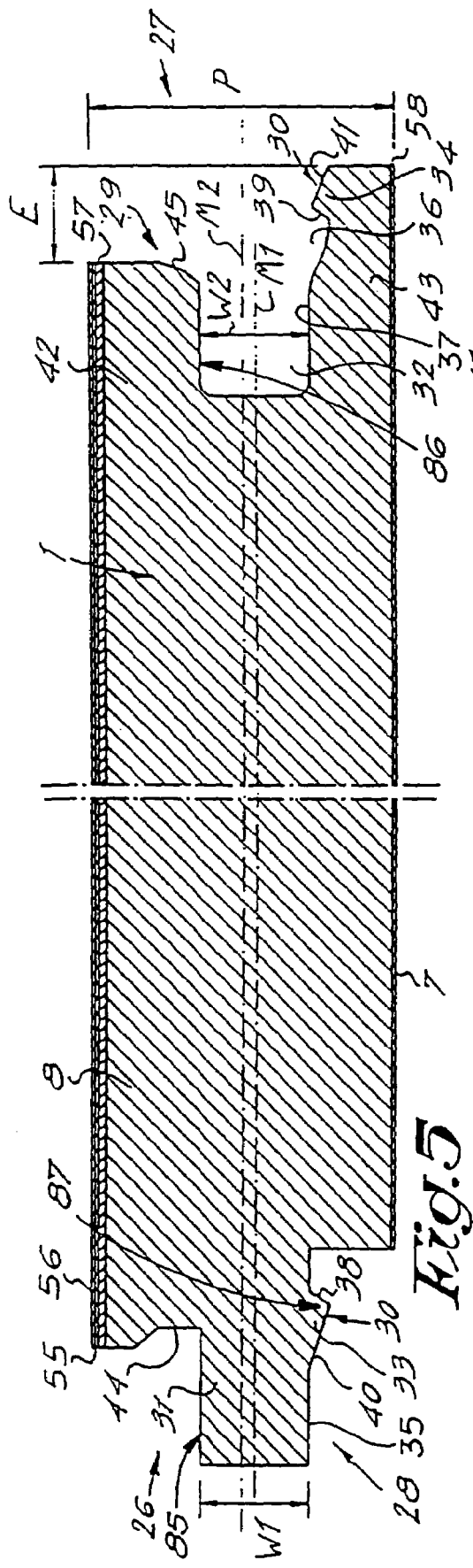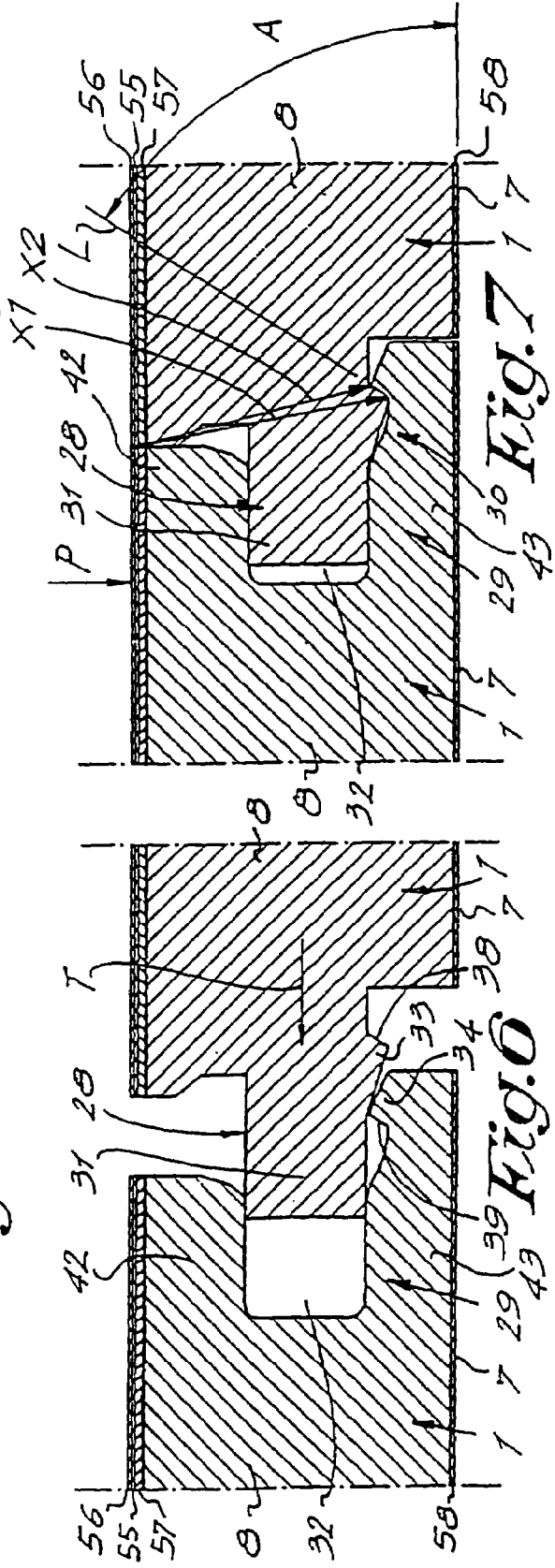

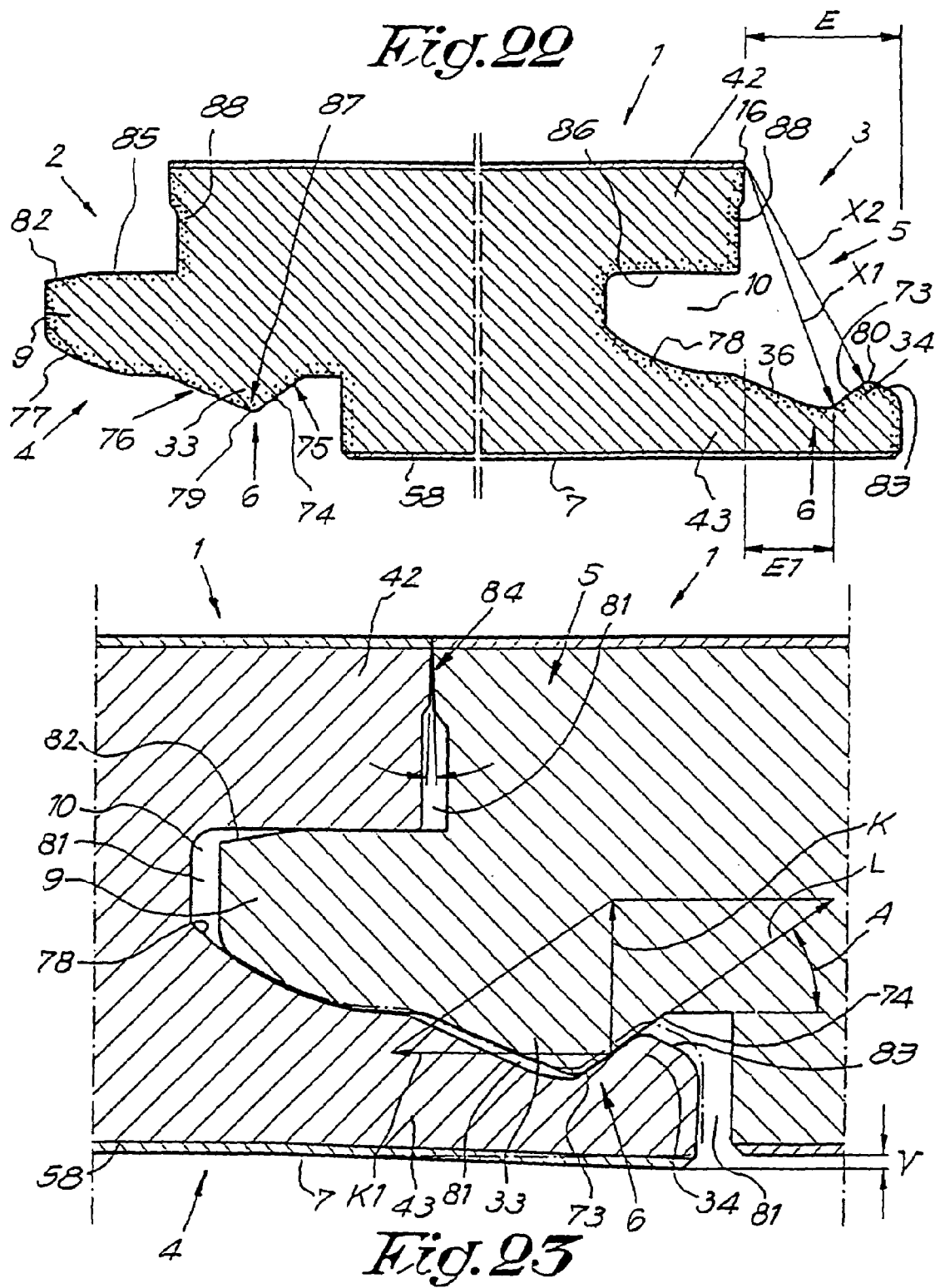

FLOOR PANELS WITH EDGE CONNECTORS

RELATED APPLICATION DATA

This application is a continuation of pending application Ser. No. 11/417,189 filed May 4, 2006; which is a continuation of application Ser. No. 10/256,183 filed Sep. 27, 2002, now U.S. Pat. No. 7,040,068; which is a continuation of application Ser. No. 09/471,014, filed Dec. 23, 1999, now U.S. Pat. No. 6,490,836; which is a continuation of application Ser. No. 08/872,044 filed Jun. 10, 1997, now U.S. Pat. No. 6,006,486.

BACKGROUND OF THE INVENTION

1. Field of the Invention

This invention relates to a floor covering made of hard floor panels.

2. Related Technology

In the first instance, the invention is intended for so-called laminated floors, but generally it can also be applied for other kinds of floor covering, consisting of hard floor panels, such as veneer parquet, prefabricated parquet, or other floor panels which can be compared to laminated flooring.

It is known that such floor panels can be applied in various ways.

According to a first possibility, the floor panels are attached at the underlying floor, either by glueing or by nailing them on. This technique has a disadvantage that is rather complicated and that subsequent changes can only be made by breaking out the floor panels.

According to a second possibility, the floor panels are installed loosely onto the subflooring, whereby the floor panels mutually match into each other by means of a tongue and groove coupling, whereby mostly they are glued together in the tongue and groove, too. The floor obtained in this manner, also called a floating parquet flooring, has as an advantage that it is easy to install and that the complete floor surface can move which often is convenient in order to receive possible expansion and shrinkage phenomena.

A disadvantage with a floor covering of the above-mentioned type, above all, if the floor panels are installed loosely onto the subflooring, consists in that during the expansion of the floor and its subsequent shrinkage, the floor panels themselves can drift apart, as a result of which undesired gaps can be formed, for example, if the glue connection breaks.

In order to remedy this disadvantage, techniques have already been through of whereby connection elements made of metal are provided between the single floor panels in order to keep them together. Such connection elements, however, are rather expensive to make and, furthermore, their provision or the installation thereof is a time-consuming occupation.

Examples of embodiments which apply such metal connection elements are described, among others, in the documents WO 94/26999 and WO 93/13280.

Furthermore, couplings are known which allow coupling parts to snap fit into each other, e.g., from the documents WO 94/1628, WO 96/27719 and WO 96/27721. The snapping-together effect obtained with these forms of embodiment, however, does not guarantee a 100-percent optimum counter-action against the development of gaps between the floor panels, more particularly, because in fact well-defined plays have to be provided in order to be sure that the snapping-together is possible.

From GB 424.057, a coupling for parquetry parts is known which, in consideration of the nature of the coupling, only is appropriate for massive wooden parquetry.

Furthermore, there are also couplings for panels known from the documents GB 2.117.813, GB 2,256.023 and DE 3.544.845. These couplings, however, are not appropriate for connecting floor panels.

BRIEF SUMMARY OF THE INVENTION

The invention aims at an improved floor covering of the aforementioned type, the floor panels of which can be coupled to each other in an optimum manner and/or the floor panels of which can be manufactured in a smooth manner, and whereby preferably one or more of the aforementioned disadvantages are excluded.

The invention also aims at a floor covering which has the advantage that no mistakes during installing, such as gaps and such, can be created.

Furthermore, the invention also aims at a floor covering whereby the subsequent development of gaps is excluded or at least counteracted in an optimum manner, whereby also the possibility of the penetration of dirt and humidity is minimalized.

To this aim, the invention relates to a floor covering, consisting of hard floor panels which, at least at the edges of the two opposite sides, are provided with coupling parts, cooperating which each other, substantially in the form of a tongue and a groove, wherein the coupling parts are provided with integrated mechanical locking elements which prevent the drifting apart of two coupled floor panels into a direction perpendicular to the related edges and parallel to the underside of the coupled floor panels. Hereby, these coupling parts are optimalized in such a manner that they allow that any form of play is counteracted and preferably is excluded.

By integrated mechanical locking elements is understood that these form a fixed part of the floor panels, either by being connected in a fixed manner to the floor panels, or by being formed in one piece therewith.

In a first important preferred form of embodiment, the coupling parts are provided with locking elements which, in the engaged position of two or more of such floor panels, exert a tension force upon each other which force the floor panels towards each other. As a result of this that not only the formation of gaps counteracted during installation, but also in a later stage the development of gaps, from any causes whatsoever, is counteracted.

According to another characteristic of the intention, the coupling parts, hereby are formed in one piece with the core of the floor panels.

According to a second important preferred embodiment, the aforementioned optimalization is achieved in that the floor covering panel possesses the following combination of characteristics: the coupling parts and locking elements are formed in one piece with the core of the floor panels; the coupling parts have such a shape that two subsequent floor panels can be engaged into each other exclusively by snapping together and/or turning, whereby each subsequent floor panel can be inserted laterally into the previous; the coupling parts are interlocked free from play in all directions in a plane extending perpendicular to the aforementioned edges; the possible difference between the upper and lower lip of the lips which border the aforementioned grooves, measured in the plane of the floor panel and perpendicular to the longitudinal direction of the groove, is smaller than one time the total of the thickness of the panel; the total thickness of each related floor panel is larger than or equal to 5 mm; and that the basic material of the floor panels, of which the aforementioned core and locking elements are formed, consists of a ground product which, by means of a binding agent or by means of melting together, is made into a unitary composite, and/or of a product on the basis of synthetic material and/or of a chip board with fine chips.

Due to the fact that the coupling parts provide for an interlocking free from play, as well as due to the fact that these coupling parts are manufactured in one piece, from the basic material of the floor panels, a perfect connection between adjacent floor panels can always be guaranteed, even with repeated expansion and shrinkage of the floor surface.

This combination of characteristics can be combined or not with the aforementioned characteristic that the locking elements exert a tension force upon each other when panels are joined together.

According to a third important preferred embodiment, the characteristics of which may or may not be combined with the characteristics of the embodiments described above, the floor covering is characterized in that the lower lip which limits or defines the lower side of the groove, extends beyond the upper lip in the plane of the panel; the locking elements are formed at least of a contact portion which inwardly slopes downward; and that this portion, at least partially, is located in the portion of the lower lip which extends beyond the upper lip. The advantages of these features will appear from the further description.

According to a preferred form of embodiment, the floor panels are configured as elongated panels and the coupling parts described above are applied along the longitudinal sides of these panels.

According to a particular form of embodiment, coupling parts are provided at the other two sides, too, either of another construction than described above or not.

In the most preferred form of embodiment, for the basic material use shall be made of the aforementioned product, which, as said, is ground and, by means of a binding agent, made into a unitary composite material. More particularly, for the core use shall be made of finely-ground wood which preferably is glued, more particularly, moisture resistant glued. Still more particularly, for the core use shall be made of so-called HDF board (High Density Fibreboard) or MDF board (Medium Density Fibreboard) which is highly compressed ground wood particles (fibers) and binder material. Hereinafter, the wood component of the core material shall be referred to as "wood product".

The fact that the invention is applied to floor panels the basic material of which consists of the material described above, offers the advantage that with the processing of this material, very smooth surfaces are obtained whereby very precise couplings can be realized, which, in first instance, is important in the case of a snap-together connection and/or turning connection free from play. Also, very special forms of coupling parts can be manufactured in a very simple manner because the aforementioned kinds of material can be processed particularly easy.

The surfaces obtained with HDF and MDF also have the advantage that the floor panels mutually can be shifted readily alongside each other in interlocked condition, even when engaged with a tensioning force.

The applicants also discovered that the aforementioned materials, in particular HDF and MDF, show ideal features in order to realize a connection, such as mentioned above, as these material show the right features in respect to elastic deformation in order to, on the one hand, realize a snap-together effect, and, on the other hand, receive expansion and shrinkage forces in an elastic manner, whereby it is avoided that the floor panels come unlocked or are damaged in an irreparable manner.

In the case that for the core use is made of a material based on synthetic material, to this end solid synthetic material can be used as well as a mixture of synthetic materials, eventually composed of recycled materials.

The floor covering preferably is formed by joining the floor panels into each other free of glue. Hereby, the connections are of such nature that the floor panels can be disassembled without being damaged, such that, for example, when moving from one residence or location to another, they can be taken along in order to be placed down again. It is, however, clear that a glueing between tongue and groove is not excluded.

The invention, of course, also relates to floor panels which allow the realization of the aforementioned floor covering.

The invention also relates to a method for the manufacturing of the aforementioned floor panels with the advantage that the tongues and/or grooves, including the corresponding locking means, can be provided at the floor panels at high production speeds without problems. More particularly, it aims at a method which allows that the rather complicated forms of the tongue and the groove of the aforementioned floor panels can be formed completely by means of milling cutters, the diameter of which can be chosen independent of the form to be realized, such that the use of small milling cutters, for example finger cutters, with diameters smaller than the depth of the tongue or groove can be excluded.

In accordance with this method the tongue and/or groove is formed by means of a milling process using at least two sequential milling cycles or passes by means of milling cutters which are positioned at different angles in respect to the related floor panel. During each of the aforementioned milling cycles, preferably substantially the final form of one flank, either of the tongue or of the groove, is formed.

For the aforementioned two milling cycles, thus, milling cutters are used which extend outside the groove, respectively the tongue. More particularly the diameters of these milling cutters shall at least be 5 times and even better 20 times larger than the thickness of the floor panels.

The use of milling cutters having the aforementioned diameters has as an advantage that the normal production speeds can be maintained which are also applied during milling of a classical straight tongue and groove. There is also the advantage obtained that the installation of such milling cutters induce only minor or no additional costs because such milling cutters can be placed directly upon a motor shaft and/or the conventional machines can be used.

BRIEF DESCRIPTION OF THE DRAWINGS

With the intention of better showing the characteristics according to the invention, in the following, as an example without any limitative character, several preferred forms of embodiment are described, with reference to the accompanying drawings, wherein:

FIG. 1 represents a floor panel of a floor covering according to the invention;

FIG. 2, on a larger scale, represents a cross-section according to line II-II in FIG. 1;

FIGS. 3 and 4 represent how two floor panels with coupling parts according to FIG. 2 match into each other;

FIG. 5, on a larger scale, represents a cross-section according to line V-V in FIG. 1;

FIGS. 6 and 7 represent how two floor panels with coupling parts according to FIG. 5 match into each other;

FIGS. 8 to 11 represent a number of variants of coupling parts of floor panels according to the invention;

FIG. 22 represents a floor panel according to the invention;

FIG. 23, on a larger scale, represents the coupling of two floor panels of FIG. 22;

DETAILED DESCRIPTION

Figure 9:
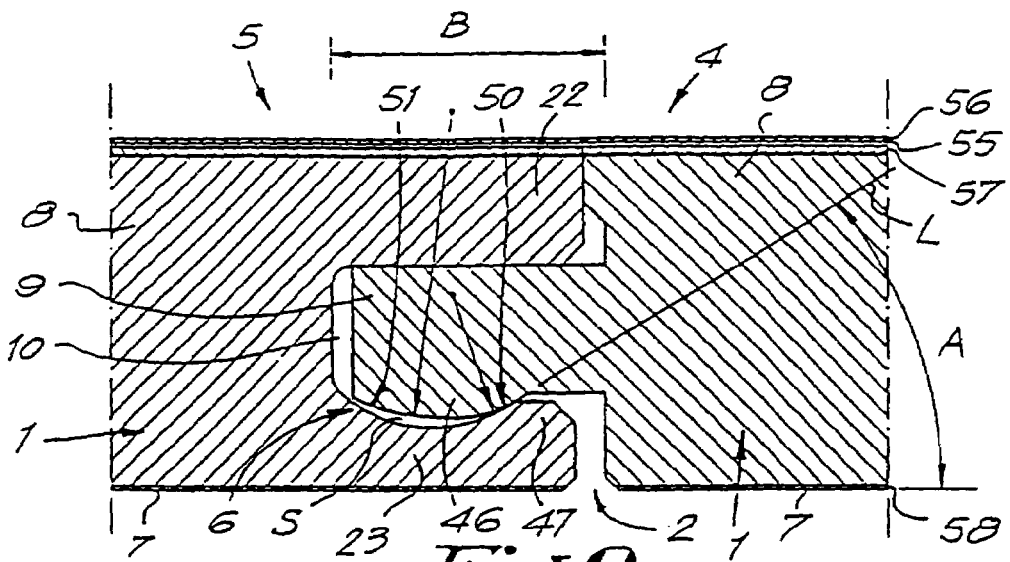

The invention relates to a floor covering which is composed of hard floor panels 1, for example, such as a laminated panel as shown in FIG. 1.

These floor panels 1 can be of various shape, for example, elongated or square, or of any other shape having linear side edges intersecting at angles (rectangular).

In the most preferred form of embodiment, they shall be manufactured in an elongated form, such as shown in FIG. 1, for example, with a length of 1 to 2 meters. The thickness, however, can also vary, but is preferably 0.5 to 1.5 cm, and more particularly 0.8 cm.

Each floor panel 1 is, at least at the edges of two opposite sides 2-3, provided with tongue and groove coupling parts 4-5 which permit two adjacent identical floor panels 1 to be coupled to each other.

According to the invention, the coupling parts 4-5, as represented in the FIGS. 2 to 4, are provided with integrated mechanical locking parts or locking elements 6 which prevent the drifting or sliding apart of two coupled floor panels 1 in a direction D perpendicular to the respective sides 2-3 and parallel to the underside 7 of the coupled floor panels 1; the coupling parts 4-5 and the locking elements 6 are formed in one piece with the core 8 of the floor panels 1; the coupling parts 4-5 have such a shape that two subsequent floor panels 1 can be engaged into each other solely by snapping-together and/or turning after the coupling parts are partially engaged, whereby each subsequent floor panel 1 can be laterally inserted into the previous; and the coupling parts 4-5 preferably are interlocked free from play in all directions in a plane which is located perpendicular to the aforementioned edges.

In the case of floor panels 1 with an elongated shape, as represented in FIG. 1, the respective coupling parts 4-5 are located at the longitudinal sides 2-3.

The coupling parts 4-5 can be realized in various forms, although the basic forms thereof will always be formed by a tongue 9 and a groove 10.

In the form of embodiment of FIGS. 2 to 4, the related floor panel 1 is provided with tongue and groove coupling parts 4-5 and locking means or locking elements 6 which allow the coupling parts of two floor panels 1 to be mutually engaged by means of a turning movement, without the occurrence of any snap-together effect.

In the represented example, the locking elements 6 consist of a first locking element 11, formed by a protrusion with a bent round shape at the lower side 12 of the tongue 9, and a second locking element 13 (shown in FIG. 2), formed by a recess with a bent hollow upwardly facing or downwardly concave shape in the upper side of lower wall 14 of the lower lip of the groove 10.

The locking elements 11-13 ensure that two floor panels 1 which are coupled to each other can not move laterally in the horizontal plane with respect to each other.

In order to enable two floor panels 1 to be inserted into each other by means of a turning movement, the curvatures preferably are circular. The bottom side 12 of locking means or locking elements 6 has a curvature with a radius R1, the center of which coincides with the respective upper side edge 15 of the floor panel 1, whereas the upper side of the lower lip of the groove locking part 5 has a curvature with a radius R2 which is equal to the radius R1, but its center coincides with the respective upper edge 16. Radii R1 and R2 may also be applied which are larger or smaller than the distance to the upper side edges 15, 16 respectively, and/or which differ from each other in size.

The upper side 17 of the tongue 9 (called an upper tongue contact surface) and the lower side upper wall or side 18 of the upper lip of groove 10 are preferably flat and preferably are located in the horizontal plane.

The inner side 20 of the groove 10 and the front side 19 of the tongue 9 of the two interlocked floor panels 1 preferably do not fit closely against each other, such that an intermediate space 21 is created between them into which possible dust remainders or such can be pushed away by means of the tongue 9.

The tongue 9 and the groove 10 preferably have shapes which are complementary to each other, such that the upper side 17 of tongue 9 in the engaged condition of two identical floor panels 1 precisely sits against the upper lip lower side 18 and the lower wall 14 of the lower lip of the groove 10, whereby a pressure P, exerted against the upper lip 22, is received or reacted not only by this lip 22, but by the complete structure, because this pressure can be transmitted through the tongue 9 and the lower lip 23 to cause the panels to be urged towards each other.

It is, however, clear that a number of minor deviations to these complementary forms can occur which, anyhow, have no or almost no effect upon the receipt and transmission of pressure forces. For example, a chamfer 24 on lip 22 and a recess 25 can be provided, as represented in FIGS. 2 to 4, as a result of which the subsequent floor panels 1 can easily be pushed and guided into each other, such that no possible ridges in the subflooring or such render good insertion difficult.

As represented in the FIGS. 5 to 7, the floor panels 1 according to the invention can also, along the sides 26-27 which are at a right angle to the sides 2-3, be provided with coupling parts 28-29 which have locking elements 30, too. The coupling parts 28-29 are preferably also realized in the shape of a tongue 31 and a groove 32. Hereby, the locking elements 30 do not have to be of the same nature as the locking elements 6.

Preferably, at the sides 26-27 locking elements are provided which allow for an engagement and interlocking by means of a lateral translation movement in direction T only, as represented in FIGS. 6 and 7. To this aim, the locking elements 30 consist of a snap-together connection with locking elements 33 and 34 which grip behind each other.

As represented in FIGS. 5 to 7, the locking element 33 preferably consists of a downwardly extending protrusion of the lower side 35 of the tongue 31 which can be located in an upwardly facing recess 36 in a lower lip 43 extending distally from the the inner side of the groove 32. The locking element 34 is formed by the upward directed part or protrusion which defines the distally outer end of recess 36.

In this case, the locking elements 33-34 have contact or locking surfaces 38-39 which are parallel to each other and preferably extend in an obliquely inclined manner, according to a direction which simplifies the snapping-together of the panels, as illustrated. The common line or plane of tangent L ( which may be referred to as "tangent line") which is determined by the common tangent at the meeting point or area of surfaces 38-39, hereby forms an angle A sloping inwardly and downwardly from an outer region to an inner region relative to the underside 7 of the panel having the groove coupling part, which angle is smaller than 90°.

The locking elements 33-34 preferably are provided with inclined portions 40 and 41 extending downwardly and proximally from a distal zone to a proximal zone on the tongue element and downwardly and distally and distally from a proximal towards a distal zone on the lower lip of the groove, which, when two floor panels 1 are engaged, cooperate with each other in such a manner that the locking elements 33-34 can easily be pushed over each other until they grip behind each other at their locking surfaces by means of a snap-together effect (FIGS. 6 and 7).

The thickness W1 of the tongue 31 preferably is equal to the width W2 of the groove 32, such that compression pressure P applied to the upper lip 42 is reacted by the tongue 31 which, in its turn, then is reacted by the lower lip 43.

Analogous to the chamfer 24 and recess 25, a recess 44 and a chamfer 45 are provided also at the edges 28-29.

It is noted that such a snap-together coupling can also be applied at the edges 2-3. Hereby, this can be a snap-together coupling analogous to these of FIGS. 5 to 7, but this can also be a snap-together coupling using other forms of coupling configurations, for example, such as represented in FIGS. 8 and 9. Contrary to the locking elements 33-34 which consist of rather local protrusions, in the forms of embodiment of FIGS. 8 and 9 use is made of locking elements 46-47 which, in comparison to the total width B of the coupling, extend over a rather large distance.

In this case, the locking elements 46-47 are also provided at the lower side 12 of the tongue 9 and the upper side of the wall 14 of the lower lip of groove 10.

According to FIG. 8, the locking elements 46-47 have locking surfaces 48-49 which are at an angle with the plane of the floor panel 1. In this manner, a coupling is obtained which is interlocked in a particularly fixed manner.

As represented in FIG. 9, the locking elements 46-47 possibly can be configured in such a manner that substantially only a linear contact at the locking surfaces is obtained, for example, because the locking surfaces directed towards each other are formed with different curvatures.

The locking surfaces, directed towards each other, of the locking elements 46-47 according to FIG. 9 hereby consist of curved surfaces. The common line or plane of tangency L forms an angle A which is smaller than 90°, and more preferably is smaller than 70°.

In this manner, the locking element 46 preferably has two portions with a different curvature, on one hand, a portion 50 with a strong curvature and, on the other hand, a portion 51 with a weak curvature. The portion 50 with the strong curvature provides for the formation of a firm coupling. The portion 51 with the weak curvature facilitates the coupling parts 4-5 to be brought into each other easily. The intermediate space (show at 21 in FIG. 8) forms a chamber which offers space for dust and the like which, when engaging two floor panes 1, inevitably infiltrates there.

In the case of a snap-together connection, for example, a connection such as represented in FIGS. 7 to 9, preferably the tongue 9-31 has a shape that thickens from below, which then can cooperate with a widened portion in the groove 10, the lower lip of which likewise varies in thickness, as shown.

Figure 10:
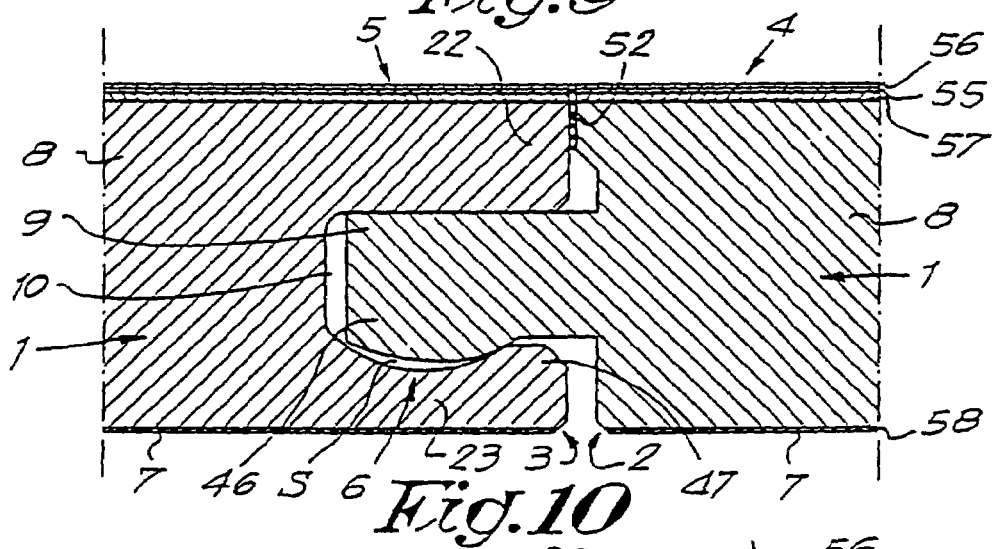

In FIG. 10, a variant is represented whereby at least at the level of the upper side edges 15-16, a sealing material 52 is provided, as a result of which a watertight sealing can be assured. This sealing material 52 may consist of a strip or covering which is provided previously at the floor panel 1, either at one or both upper side edges 15-16.

Figure 11:
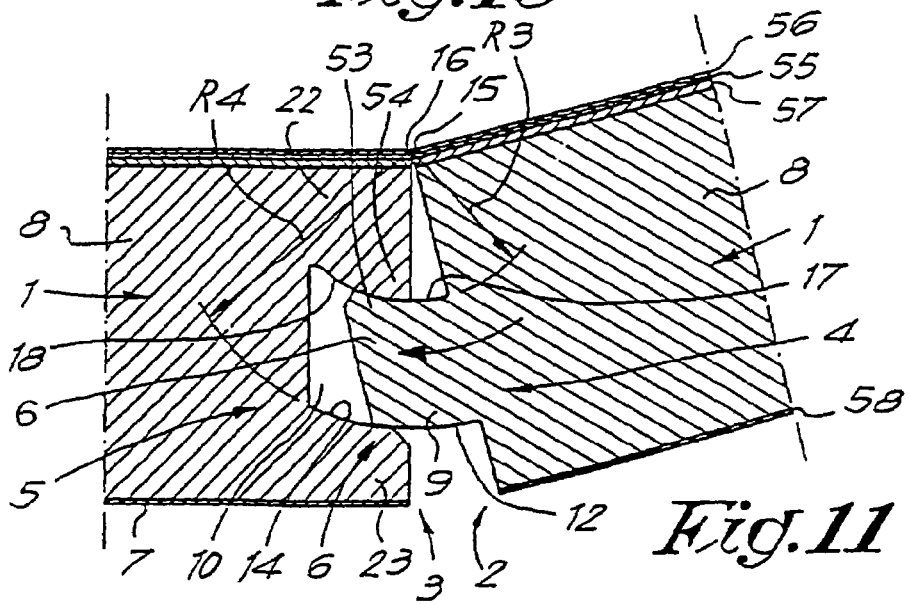

In FIG. 11, a further variant is represented, whereby the locking element 6 is formed by an upward directed portion 53 at the tongue 9, which as a result of a turning movement of the panel, is brought behind a downward-directed portion 54 on the upper wall 18. More particularly, this is obtained by forming the upper side 17 and the upper wall 18 with a curvature R3, the center of which is situated at the upper side edges 15-16, and forming the tongue lower side 12 and the wall 14 of lower lip 23 with a radius R4, the center of which is also situated at the upper side edges 15 and 16, respectively. These radii R3-R4 can be chosen otherwise, too.

In general, according to the invention, the difference between, on one hand, the radius R1, R3 respectively, and, on the other hand, the radius R2, R4 respectively, preferably should not be larger than 2 mm.

It is also preferred that the center of these radii be situated inside the circle C1, C2 (see FIG. 2) respectively, which extends with a radius R5 of 3 mm centered at upper side edge 15, 16 respectively.

Finally is noted that, according to the invention, the lower lip 23-43, as represented in FIGS. 2 to 7, can be formed distally longer than the upper lip 22-42 possibly with the recesses of the locking elements extending partially under the upper lip and preferably, where the lower lip is longer than the upper lip, with the lower lip locking surface located beyond the upper lip. This has an advantage that the coupling parts 4-5-28-29 can he shaped in an easier manner by means of a milling cutter or the like. Furthermore, this simplifies the engagement of two floor panels 1, because each subsequent floor panel 1 during installation can be placed upon the protruding lower lip 23-43, as a result of which the tongue 9-31 and the groove 10-32 automatically are positioned in front of each other.

The embodiments wherein the lower lip 23 is equal to or distally shorter than the upper lip 22, in their turn, offer the advantage that no protruding lip 23 remains at the extreme edge of the floor which might cause problems in finishing the floor installation.

In order to allow for a smooth assembly, to guarantee the necessary stability and firmness and in order to limit the quantity of material to be cut away, the difference E between the distally outer edge of the upper lip 22-42 and the distally outer edge of the lower lip 23-43, measured in the plane of the floor panel and perpendicular to the longitudinal direction of the groove 10, should preferably be kept smaller than one time the total thickness F of the floor panel 1. For stability's sake, normally this total thickness F shall never be less than 5 mm.

The small dimension of the difference E offers the advantage that the lower lip need not be strengthened by a reinforcement strip or the like.

According to a particular form of embodiment, the central line M1 through the tongue 9 and the groove 10 is situated lower than the center line M2 of the floor panel 1, such, that the upper lip 22-42 is thicker than the lower lip 23-43. In first instance, this is essential in this kind of connection, because then it is the lower lip 23-43 which bends, whereby the upper side of the floor panel 1 is kept free of possible deformations.

As explained in the introduction, for the core 8 a material is chosen from the following series:
  a ground product which, by means of a binding agent or by means of melting together is made into a unitary composite material;
  a product based on synthetic material;
  chip board with fine chips.

The invention shows its usefulness, in first instance, preferably with laminated flooring, due to the reasons explained in the introduction.

As represented in the examples of the FIGS. 2 to 11, such laminated flooring preferably consists of a core 8 made of MDF medium density fiberboard board, HDF high density fiberboard board or similar, whereby at least at the upper side of this core 8 one or more layers of material are provided.

More particularly, it is preferred that the laminated flooring is provided with a decorative layer 55 and a protective top layer 56. The decorative layer 55 is a layer, impregnated with resin, for example, made of paper, which can be imprinted with a variety of patterns, such as a wood pattern, a pattern in the form of stone, cork, or similar or even with a fancy pattern. The protective top layer 56 preferably also consists of a layer saturated with resin, for example, melamine resin, which in the final product is transparent.

It is clear that still other layers can be applied, such as an intermediate layer 57 upon which the decorative layer 55 is provided.

Preferably, also a backing layer 58 shall be applied at the underside 7, forming a counterbalancing element for the top layers and, thus, guaranteeing the stability of the form of the floor panel 1. This backing layer 58 may consist of a material, for example paper, impregnated with a resin, for example, a melamine resin.

Figure 12:
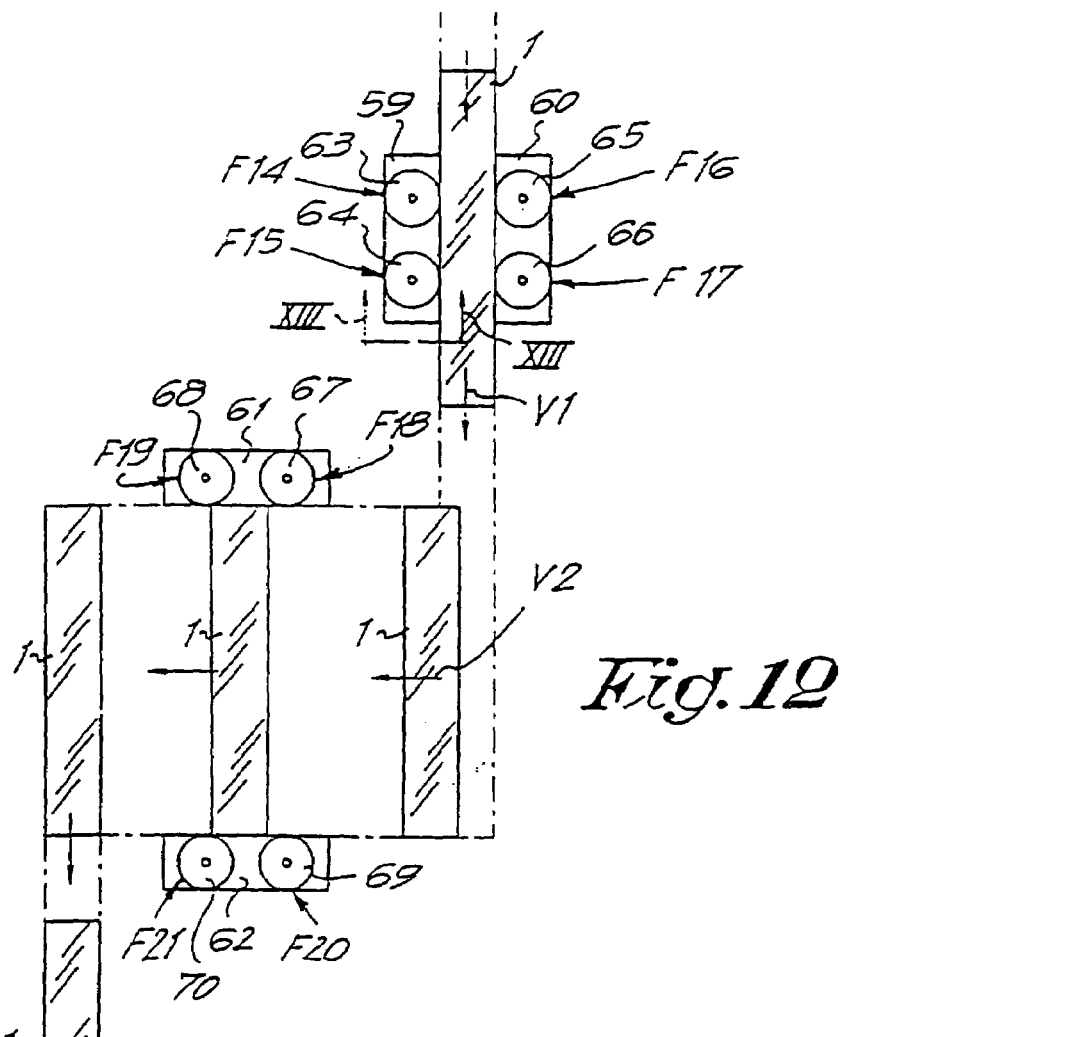
FIG. 12 schematically represents how the floor parts can be provided with coupling parts.

As represented schematically in FIG. 12, the tongue 9 and the groove 10, and preferably also the tongue 31 and the groove 32 are formed by means of a milling process. In the case that a profile has to be applied on all four sides, the floor panels 1 preferably shall be displaced by means of two sequential perpendicular movements V1 and V2, whereby during the first movement profiles at two opposite edges are provided, in this case the longitudinal edges, by means of milling devices 59-60, whereas during the second movement profiles are provided at the other edges, in this case the small edges, by means of milling devices 61-62. During these processing, the floor panels 1 preferably are put with their decorative layer directed downward.

According to an important characteristic of the invention, each respective tongue 9-31 and groove 10-32 are formed by means of a milling process with at least two sequential milling cycles or passes by means of milling cutters which are positioned at different angles in reference to the related floor panel 1.

Figure 13:
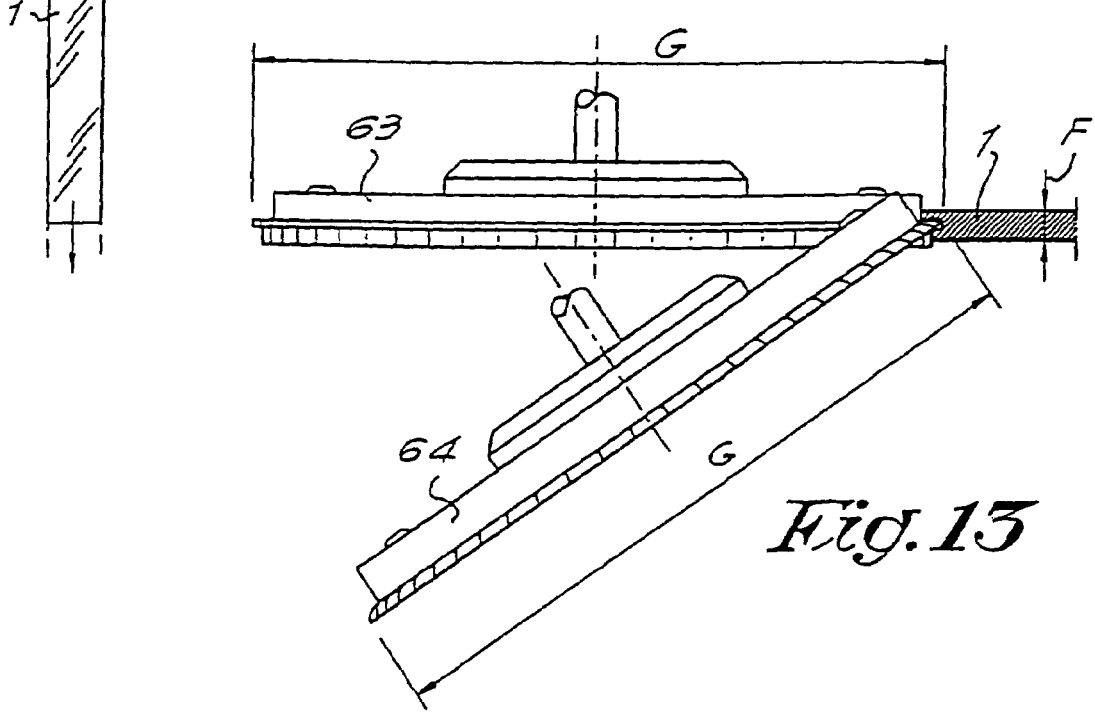
FIG. 13 represents a cross-section according to line XIII-XIII in FIG. 12.
Figure 14:
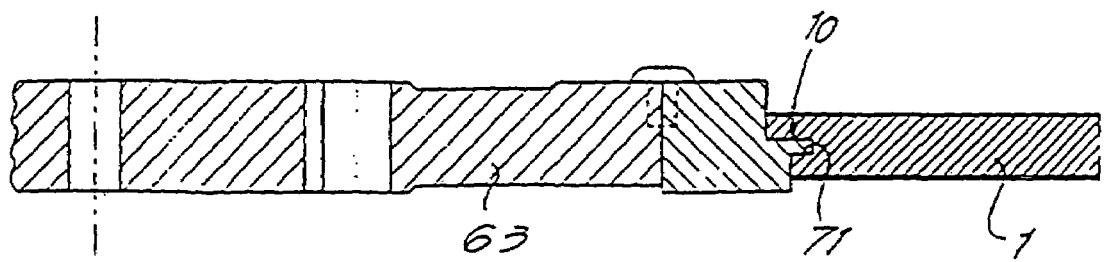
FIGS. 14 to 21, on a larger scale and in cross-section, represent the penetration of the milling cutters which are indicated in FIG. 12 with arrows F14 to F21.
Figure 15:
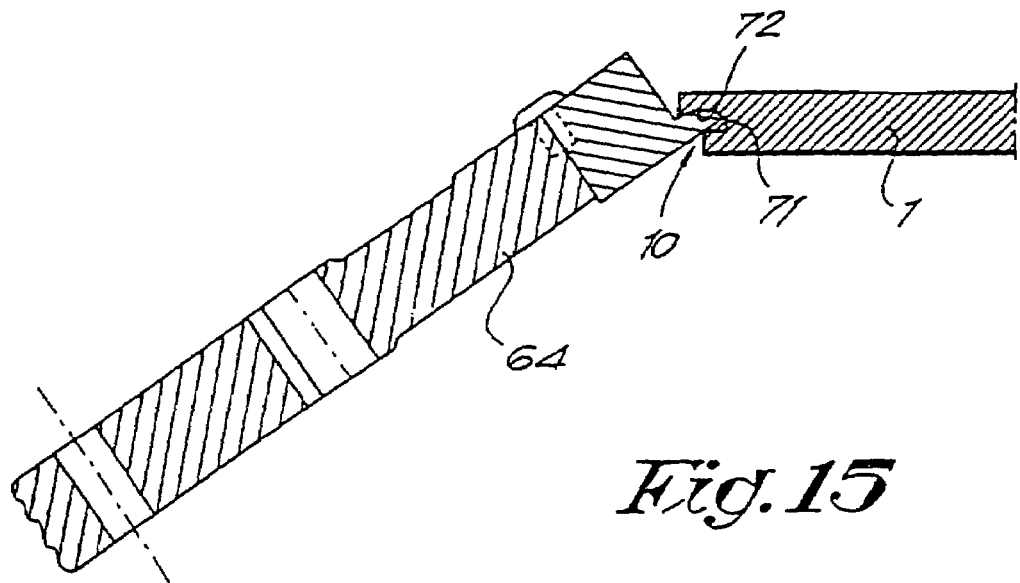
Figure 16:
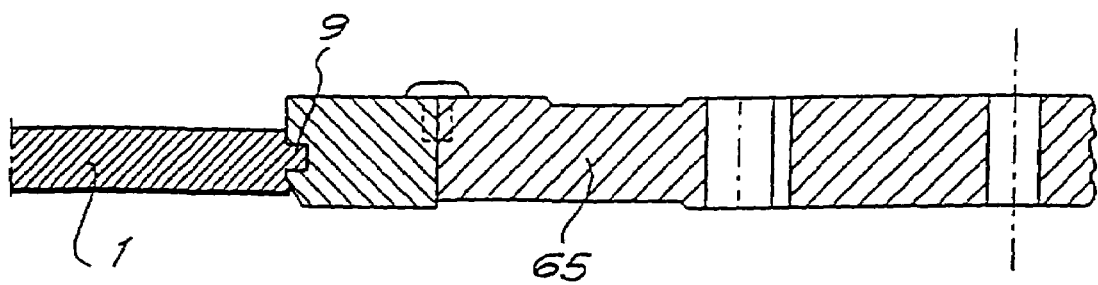
Figure 17:
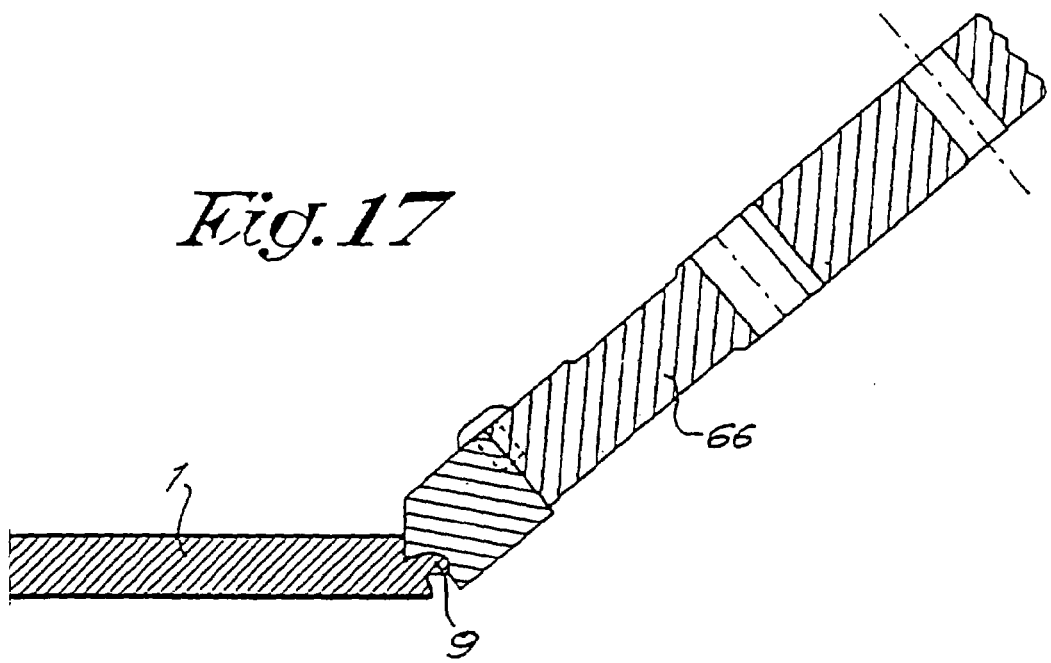
Figure 18:
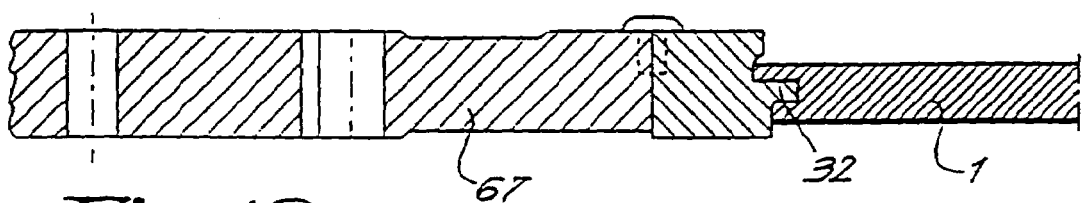
Figure 19:
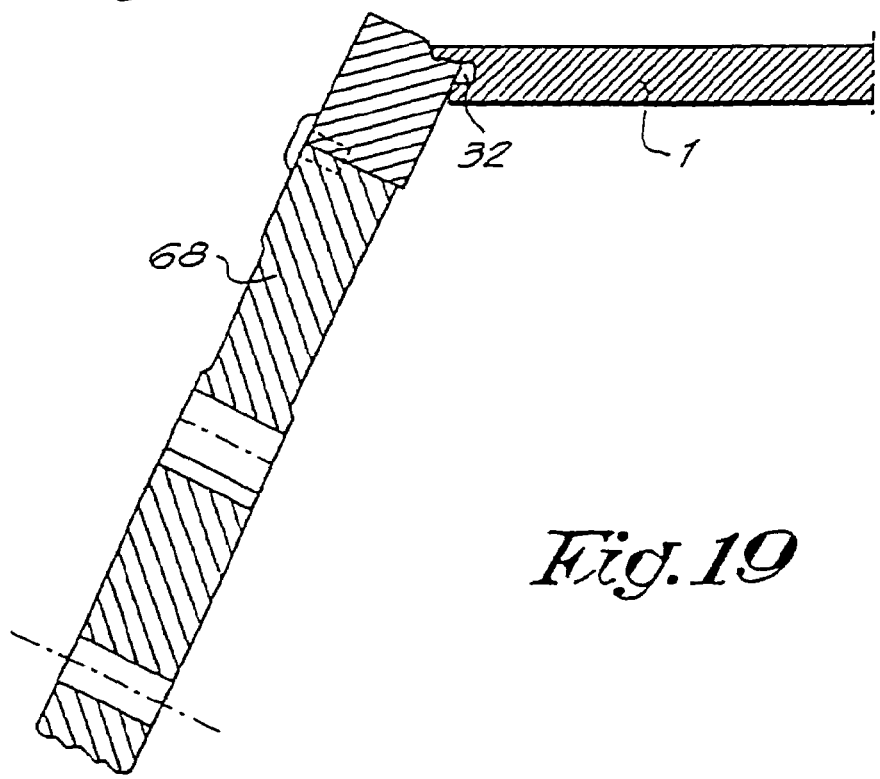
Figure 20:
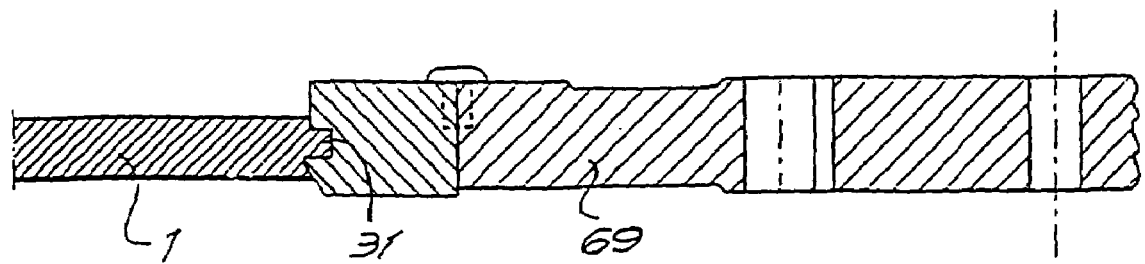
Figure 21:
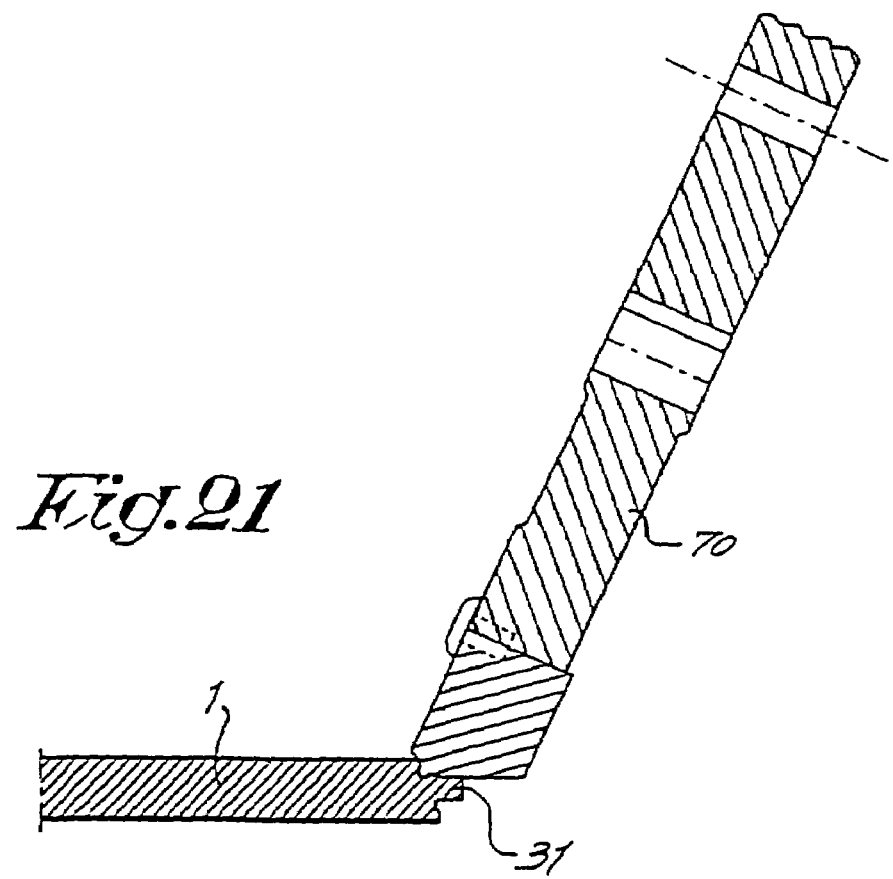

This is illustrated in FIGS. 13, 14 and 15, wherein it is represented how a groove 10 is realized by means of two milling cycles by means of two milling cutters 63 and 64. FIGS. 16 and 17 represent how the tongue 9 is shaped by means of milling cutters 65 and 66.

The FIGS. 18-19 and 20-21 represent similar views showing how the groove 32 and the tongue 31 are shaped by means of milling cutters 67-68 and 69-70, positioned at an angle.

During each of the aforementioned milling passes, substantially the final shape of one flank is fully realized. For example, the milling cutter 63 of FIG. 14 determines the final shape of the lower flank 71 of the groove 10, whereas the milling cutter 64 determines the final shape of the upper flank 72.

As mentioned in the introduction, preferably milling cutters 63 to 72 shall be used, having diameters G which are at least 5 times, and even better at least 20 times larger than the thickness F of the floor panels 1.

Apart of the mentioned milling cutters, preferably still other milling cutters are applied, for example, in order to remove a part of the material to be removed during a first premachining cycle.

In the FIGS. 22 to 25, a particularly preferred form of embodiment of a floor panel 1 according to the invention is represented. Hereby, the parts which correspond with the previous embodiments are indicated with corresponding references.

An important characteristic herein consists in that the coupling parts 4-5 are provided with locking elements 6 which, in engaged condition with the panels in a common plane, exert a tension force upon each other, as a result of which the engaged floor panels 1 are forced towards each other in compression. As represented, this is realized preferably by providing the coupling parts with an elastically yieldable or bendable portion, in this case the lower lip 43, which, in engaged condition, is at least partially bent and in this way creates a tension force which results in the engaged floor panels 1 being forced towards each other. The resultant bending V, as well as the tension force K, are indicated in the enlargement view of FIG. 23.

In order to obtain the tension force K pressing together the engaged floor panels 1, the bendable portion, in this case the lower lip 43, preferably is provided, as represented, with a proximally facing inwardly and downwardly inclined locking surface 73 which preferably can cooperate with a corresponding proximally facing (relative to the tongue) locking surface 74 on tongue 9. These locking surfaces 73-74 are similar to the aforementioned locking surfaces 39-38 and also similar to the inclined portions of the lower lip of FIGS. 2 to 4.

In the FIGS. 2 and 5, the locking elements form complementary matching shapes; it is, however, clear that, by a modification, also a tension effect similar to that shown in FIG. 23 can be realized.

Due to, on one hand, the contact between the locking surfaces along the angle A, and, on the other hand, the fact that a tension force K is created, a compression force component K1 is produced, as a result of which the floor panels 1 are drawn against each other in compression.

Preferably, the angle A of the mutual line or plane of tangency of contact surfaces 73-74 relative to the principal horizontal plane of the panel is situated between 30 and 70 degrees. In the case that use is made of the embodiment whereby a tension force K is realized, an angle A of 30 to 70 degrees is ideal in order, on one hand, to effect an optimum pressing-together of the floor panels 1 at their adjoining upper side edges and, on the other hand, to ensure that the floor panels 1 can easily be engaged and respectively disassembled.

Although the pressing or compression force component K1 preferably is delivered by the aforementioned lower lip 43, the invention does not exclude other forms of locking elements or structures whereby this force is delivered by other bendable portions.

It is noted that the bending V is relatively small, for example, several hundredths up to several tenths of a millimeter, and does not have an influence upon the placement of the floor covering. Furthermore it should be noted that such floor covering generally is placed upon an underlayer (not shown) which is elastically compressible, as a result of which the bending V of the lip 43 only produces local bending of the underlayer.

Due to the fact that the lip 43 is bent apart and that it remains somewhat bent apart in engaged position, the additional advantage is obtained that, when exerting a pressure upon the floor covering, for example, when placing an object thereupon, the pressing-together compressive force is enhanced and, thus, the development of undesired gaps between adjoining upper side edges is counteracted even more.

It is noted that the inventors have found that, contrary to all expectations, an ideal tension force can be realized by manufacturing the coupling parts 4-5, including the locking elements 33-34, and preferably the complete core 8, of HDF board or MDF board, although these material normally only allow a minor elastic deformation.

HDF and MDF also offer the advantage that smooth surfaces are obtained, as a result of which the locking elements can be moved easily over each other.

According to a variant of the invention, the tension force can also be supplied by means of an elastic compression of the material of the coupling parts themselves, to which end these coupling parts, and preferably the complete core 8, would be manufactured using an elastically compressible material.

Figure 24:
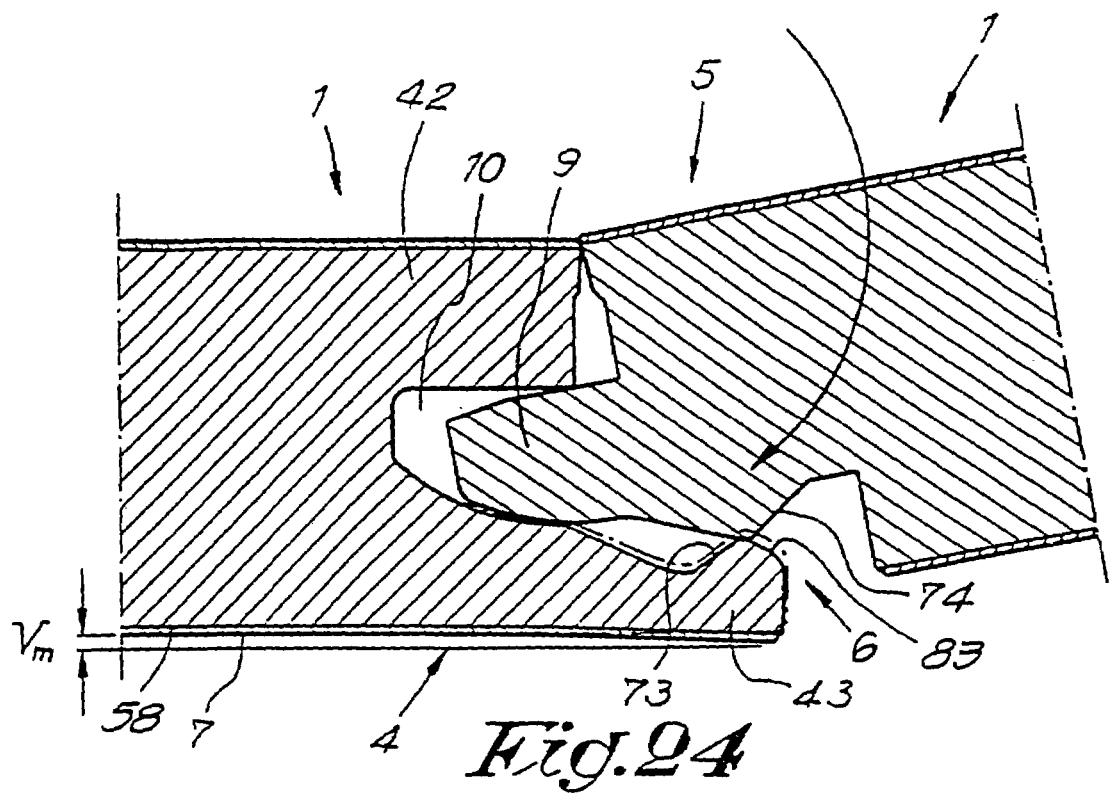
FIGS. 24 and 25 represent two manners of coupling floor panels according to FIG. 22 to each other.
Figure 25:
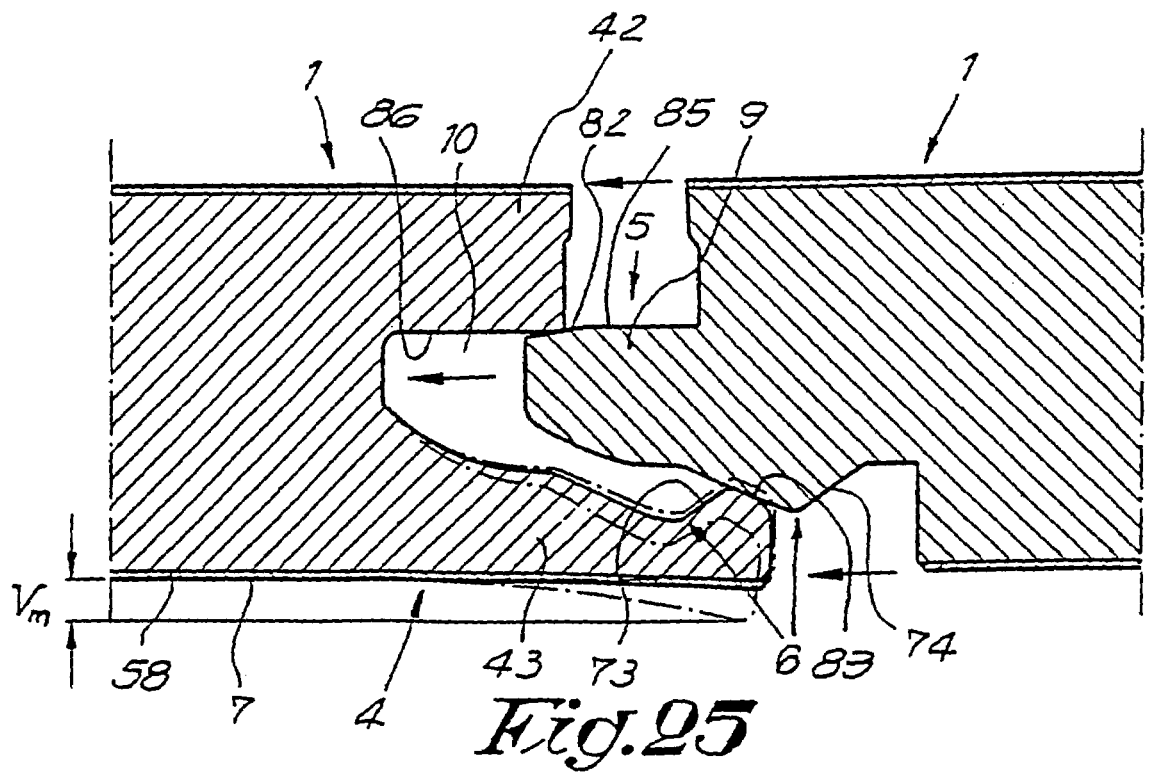

A further particular characteristic of the embodiment of FIGS. 22 to 25 consists in that the floor panels 1 can be selectively engaged by means of a turning or angling-in movement, as represented in FIG. 24, as well as by means of laterally shifting them towards each other in substantially a common plane, as represented in FIG. 25, preferably in such a manner that, during the engagement by means of the turning movement with the coupling parts partially engaged, a maximum bending Vm results in the coupling parts, more particularly in the lip 43, which bending Vm is less pronounced, if not nonexistent, as in the FIGS. 2 to 4, in comparison to the bending Vm which results when the floor panels 1 are engaged by means of shifting them towards each other, as in FIG. 15.

The advantage of this consists in that the floor panels 1 can be engaged easily by means of a turning movement, without necessitating use of a tool therefore, whereas it still remains possible to engage the floor panels also by means of shifting them laterally. This latter is useful, in first instance, when the last panel has to be placed partially under a door frame or similar situation. In this case, the floor panel 1 can be pushed under the door frame with the side which does not have to be engaged and subsequently, possibly by means of tools, can be snapped into the adjacent floor panel by lateral sliding together.

It is noted that the shapes of the coupling parts 4-5 shown in FIGS. 22 to 25 can also be used for the coupling parts 28-29 of the short sides of the panels.

According to the invention, in the case that the four sides 2-3-26-27 are provided with coupling parts 4-5-28-29, these coupling parts can be formed in such a manner that in one direction a firmer engagement than in the other direction is effected. In the case of elongated floor panels 1, for example, such as represented in FIG. 1, the locking at the small sides 26-27 preferably shall be more pronounced than at the longitudinal sides 2-3. The length of the parts at the small sides, namely, is smaller and, in principle, less firm. This is compensated for by providing a more pronounced locking.

This difference in engagement can be obtained by shaping the contact surfaces 73-74 with different angles.

Preferably, the aforementioned protrusion, more particularly the locking element 33, is bounded by at least two portions 75-76 (shown in FIG. 22), respectively a proximal portion 75 with a strong (steep) downward inclination from an upper proximal area to a lower distal area which provides for the locking, and a distal portion 76 with a weaker (less inclined) downward inclination from an upper distal area to a lower proximal area which renders the engagement or guidance of the coupling parts easier. In the embodiment of FIGS. 22 to 25, these portions 75-76 extend in straight planes, but, as already described with reference to FIG. 9, use can also be made of curved portions 50-51. In FIG. 5, these are the locking surface 38 and the distal inclined portion 40.

In the preferred form of the invention, the floor panels 1 comprise coupling parts 4-5 and/or 28-29 exhibiting one of the following or the combination of two or more of the following features:

- a curvature 77 (shown in FIG. 22) at the lower side of the tongue 9 and/or a curvature 78 at the lower lip 43 which form a guidance when turning two floor panels 1 into each other, with the advantage that the floor panels 1 can be engaged into each other easily during installation;
- roundings 79-80 at the intersection of surfaces 74 and 75 on the tongue and on the upper edge of the locking element, with the advantages that the locking elements 33-34 can easily shift over each other during their engagement, or during disassembly of the floor panels 1 and that the locking elements will not be damaged, for example, crumble away at their edges, even if the floor panels are engaged and disassembled;
- dust chambers 81, or spaces 21 as in FIGS. 4 and 23, between all sides, directed laterally towards each other, of the engaged floor panels 1, with the advantage that inclusions which get between the floor panels 1 during the engagement do not exert an adverse influence upon good engagement;
- a shaping of the tongue 9 which is such, for example, by the presence of a chamfer 82, that the upper side of the tongue 9 becomes situated from the first joining together or substantial contact of the panels, under the lower side of the upper lip 42 when the floor panels 1 are pushed towards each other in substantially the same plane, as indicated in FIG. 25, with the advantage that the front or distal extremity or end of the tongue 9 does not press against the front side of the upper lip 42 or the front edge of the bottom lip 43 when the floor panels are pushed towards each other in the same plane;
- a ramp surface 83, hereinbefore also called inclined portion 41, formed at the distally outer end of the lower lip 43, with the advantage that the locking elements 33-34 shift smoothly over each other and that the lower lip 43 is bent uniformly;
- in the engagement direction only one important contact point which is formed by a section 84 at the location of the upper side edges of the floor panels 1, with the advantage that the aforementioned tension force is optimally transferred to the upper side of the floor panels 1 and that the development of openings between the floor panels 1 is counteracted;
- contact surfaces 85-86, more particularly abutment surfaces, formed by the upper side of the tongue 9 and the upper side of the groove 10 (or more precisely the lower side of the upper lip of the groove) which, over the largest portion of their length, are flat and run parallel to the plane which is defined by the floor panels 1, as well as lower tongue and groove contact surfaces cooperating with each other, formed by curvatures 77-78, with the advantage that no mutual displacement in height between two engaged floor panels 1 is possible, even if the insertion depth of the tongue 9 into the groove 10 should vary due to various causes; in other words, no height differences may occur between the adjacent floor panels.

In the embodiment of FIGS. 22 to 25, all these characteristics are combined; it is, however, clear that, as becomes evident from FIGS. 2 to 11, these features can also be provided separately or in a limited combination with one another.

As becomes evident from FIGS. 5 to 7 and 22 to 25, an important characteristic of the preferred embodiment of the invention consists in that the cooperative locking element 6, in other words, the portion providing for the snap-together and engagement effect, are situated in that portion of the lower lip 23-43 which lies beyond the distal edge of the upper lip 22-42, more particularly, the lowermost point 87 of the locking part (i.e., protrusion) 33 is situated under the top layer of the floor panel 1. For clarity's sake, this top layer is indicated in the FIGS. 22-25 only as a single layer.

It should be noted that the combination of features, the lower lip 23-43 extending further than the upper lip 22-42; the lower lip locking elements 6 being formed at least by means of a locking surface which inwardly slopes downward relative to the lower lip, and wherein this locking surface, at least partially, is located in the portion of the lower lip 23-43 which lies distally beyond the upper lip 22-42, is particularly advantageous, among others, in comparison with the couplings for floor panels described in the documents WO 94/01628, WO 94/26999, WO 96/27719 and WO 96/27721. The sloping locking surface have the advantage that the floor panels 1 can be disassembled again. The fact that this sloping portion is situated in the extended portion of the lower lip 23-43 adds the advantage that no deformations can occur during coupling which manifest themselves up to the top layer.

According to a preferred characteristic of the invention, the aforementioned locking surface 39 or 73, preferably extend in such a manner that the distance between the upper edge 16 of the panel to the locking surface 39, 73 diminishes between the proximal and distal ends of the sloping locking surface 39, 73, in other words, such that, as represented in FIG. 22, the distance X2 is smaller than the distance X1. This is also the case in FIG. 7. This geometry results in the locking surfaces 39 and 73 of the recess 36 contacting and passing over the locking surfaces 38 and 74 of the tongue locking element 30.33.

Still preferably, this portion only starts at a clear distance E1 (FIG. 22) from the outer edge of upper lip 42.

It is obvious that the coupling parts 22 to 25 can also be shaped by means of said milling process.

According to a particular characteristic of the invention, the floor panels 1 are treated at their sides 2-3 and/or 26-27 with a surface densifying agent, more particularly a surface hardening agent, which preferably is chosen from the following series of products: impregnation agents, pore-sealing agents, lacquers, resins, oils, paraffins and the like.

In FIG. 22, such impregnation 88 is represented schematically. This treatment can be performed over the complete surface of the sides 2-3 and/or 26-27 or only over specific portions hereof, for example exclusively on the surfaces of the tongue 9 and the groove 10.

The treatment with a surface densifying agent offers, in combination with the snap-together effect, the advantage that in various aspects better coupling characteristics are obtained. As a result of this, the coupling parts 4-5 and/or 28-29 better keep their shape and strength, even if the floor panels 1 are engaged and disassembled repeatedly. In particular, if the core 8 is made of HDF, MDF or similar materials, by means of this treatment a better quality of surface condition is obtained, such that no abrasion of material occurs during engaging, or during disassembling.

This treatment also offers the advantage that, at least in the case of a surface hardening, the aforementioned elastic tensioning effect is enhanced.

The present invention is in no way limited to the forms of embodiment described by way of example and represented in the figures, however, such floor covering and the pertaining floor panels 1 can be embodied in various forms and dimensions without departing from the scope of the invention.

For example, the various characteristics which are described by means of the represented embodiments or examples may be selectively combined with each other.

Furthermore, all embodiments of coupling elements described before can be applied at the longer side as well as at the shorter side of a panel.

The invention claimed is:

1. Floor panel for providing a floor covering,
    said floor panel having a substantially planar underside and a substantially planar upper side and first and second pairs of opposite sides defining side edges at the panels that include upper side edges adjacent the upper side of the panel;
    wherein the side edges of at least the first pair of opposite sides are provided with coupling parts configured so as to enable two of such panels to be coupled to each other;
    wherein the coupling parts are substantially in the form of a tongue and a groove, said groove having a proximal deepest point and being delimited by an upper lip having a distal end and a lower lip, said lower lip having an upper side and extending beyond said distal end of the upper lip;
    wherein the coupling parts are provided with integrated mechanical locking elements which prevent the drifting apart of two coupled flooring panels in a direction perpendicular to the related side edges and parallel to the underside of the coupled floor panels;
    wherein said locking elements comprise a lower lip locking element at said lower lip bordering a recess in the upper side of said lower lip and a tongue locking element formed by a protrusion at the lower side of said tongue;
    wherein said lower lip and tongue locking elements define locking surfaces, respectively at said lower lip and said tongue, which, in coupled condition of two of such panels with the tongue of one panel received in the groove of the other panel, and with the upper side edges of the respective panels adjoining each other, prevent said drifting apart of the panels at the side edges, the locking surface provided at the lower lip being located in said lower lip at a location beyond the distal end of said upper lip;
    wherein said upper side edges, coupling parts and locking elements are configured such that coupling of a pair of panels at their opposite side edges with the upper side edges adjoining is achievable by a turning movement wherein one panel by its side edge is angled-in to the side edge of the other panel until a tongue of one panel is fully received in a groove of the other panel with the locking surfaces in contact;
    wherein said locking elements which prevent the drifting apart of two of such coupled panels are substantially only present between the lower side of said tongue and the upper side of the lower lip;
    wherein the recess has a bottom and an obliquely inclined proximal side, said proximal side extending upwards from the bottom of the recess towards the inner side of the panel;
    wherein between the inclined proximal side of the recess and the deepest point of the groove, a distinctly formed bottom portion of the groove is present, said bottom portion being horizontal or having a general inclination which is less pronounced than the inclination of said inclined proximal side of the recess; and
    wherein said panel at said side edges of said first pair of opposite sides is provided with features facilitating insertion of the protrusion in the recess upon coupling two of such panels, these features including at least one of:
- the presence of an obliquely inclined front side at said protrusion; and
- the presence of an intermediate space between the front side of the protrusion and the inclined proximal side of said recess, when two of such panels are coupled to each other with the respective upper side edges adjoining each other;

wherein said second pair of opposite sides is also provided with coupling parts substantially in the form of a tongue and a groove, said groove having upper and lower lips, wherein these coupling parts are provided with integrated mechanical locking elements including cooperating locking surfaces which prevent the drifting apart of two coupled flooring panels in a direction perpendicular to the related edges and parallel to the underside of the coupled floor panels; and wherein the locking surfaces of the side edges of both pairs of opposite sides contact each other when a pair of the panels are coupled by placement of the tongue part of one panel into the groove part of the other panel with the upper side edges of the panels adjoining each other, to thereby secure the upper side edges of said coupled panels in adjoined relationship while preventing unintentional separation between the upper side edges that would produce undesired gaps between the upper side edges in directions perpendicular to the related side edges and parallel to the underside of the coupled floor panels.

2. The floor panel of claim 1, wherein in coupled condition of a pair of panels along at least said side edges of said first pair of opposite sides with the respective locking surfaces in contact with each other, said locking surfaces define a common line of tangency where they contact each other, said line of tangency being obliquely inclined relative to the panel principal plane such that it extends from an upper point distally spaced from the innermost point of the groove part to a lower point closer to the innermost point of the groove part with respect to the upper point.

3. The floor panel of claim 2, wherein said tangent line forms an angle with the underside of the floor panels which is 30 to 70 degrees.

4. The floor panel of claim 1, wherein said floor panel is selected from the group consisting of laminated floor panels, veneer parquet and prefabricated parquet.

5. The floor panel of claim 1,
wherein the upper lip of the groove at the side edges of the second pair of opposite sides includes a distal end, and said lower lip extends laterally beyond said distal end of the upper lip;

wherein said locking elements of the side edges of the second pair of opposite sides define locking surfaces, respectively at said lower lip and said tongue, which in coupled condition of two of such panels prevent said drifting apart of the panels; and wherein the locking surface at said lower lip of the groove at the respective side edge of the second pair of opposite sides is located in this lower lip at a location beyond the distal end of the related upper lip.

6. The floor panel of claim 1, wherein the floor panel has a thickness of 0.5 to 1.5 cm.

7. The floor panel of claim 1, wherein the panel is a laminate including a core, and said coupling parts and locking elements are made in one piece with the core of the floor panel.

8. The floor panel of claim 1, wherein the coupling parts and locking elements comprise cut profiles.

9. The floor panel of claim 1, wherein at the entrance of the groove a chamfer is provided at the lower edge of the upper lip.

* * * * *